(12) United States Patent
Matsutani

(10) Patent No.: US 7,716,394 B2
(45) Date of Patent: May 11, 2010

(54) CONTENT TRANSFERRING METHOD, TRANSFERRING APPARATUS, AND TRANSFERRING PROGRAM

(75) Inventor: Atsushi Matsutani, Tokyo (JP)

(73) Assignee: Sony Corporation, Tokyo (JP)

( * ) Notice: Subject to any disclaimer, the term of this patent is extended or adjusted under 35 U.S.C. 154(b) by 261 days.

(21) Appl. No.: 11/354,160

(22) Filed: Feb. 15, 2006

(65) Prior Publication Data
US 2006/0188215 A1 Aug. 24, 2006

(30) Foreign Application Priority Data
Feb. 22, 2005 (JP) ............................. 2005-045596

(51) Int. Cl.
*G06F 13/00* (2006.01)
(52) U.S. Cl. .......................................... 710/33; 710/17
(58) Field of Classification Search .................... 710/33
See application file for complete search history.

(56) References Cited

U.S. PATENT DOCUMENTS

| 5,926,623 A * | 7/1999 | Tsukakoshi et al. ......... 709/200 |
| 2001/0047290 A1* | 11/2001 | Petras et al. ................... 705/10 |
| 2002/0030853 A1* | 3/2002 | Kizaki et al. ............... 358/1.16 |
| 2002/0057900 A1* | 5/2002 | Nakajima ..................... 386/94 |
| 2003/0154187 A1* | 8/2003 | Hayakawa et al. ............. 707/1 |
| 2004/0017997 A1* | 1/2004 | Cowgill ....................... 386/65 |
| 2005/0235015 A1* | 10/2005 | Abanami et al. ............ 707/204 |

FOREIGN PATENT DOCUMENTS

| JP | 2000-021136 | 1/2000 |
| JP | 2003-077214 | 3/2003 |
| JP | 2003-319370 | 11/2003 |
| JP | 2003-345661 | 12/2003 |
| JP | 2004-294584 | 10/2004 |
| JP | 2004-355444 | 12/2004 |
| JP | 2005-025922 | 1/2005 |

OTHER PUBLICATIONS

Centered Software, Second Copy 2000 version 6.0, copyright 1992-2000, "To Set How To Copy", "custom settings".*
Approach to the charm of popular products, SECONDLOOKS, PC USER, Japan, SOFTBANK Publishing Co., Ltd., Jan. 1, 2005, vol. 12 No. 1, p. 70-73.

* cited by examiner

*Primary Examiner*—Henry W. H. Tsai
*Assistant Examiner*—John B Roche
(74) *Attorney, Agent, or Firm*—Oblon, Spivak, McClelland, Maier & Neustadt, L.L.P.

(57) ABSTRACT

Disclosed herein is a content transferring method for use with a first and a second apparatus interconnected by a communicating device. The method includes the steps of: if a storage medium managed by the second apparatus is larger in capacity than content data to be transferred from the first apparatus to the second apparatus, then performing a synchronizing process synchronizing the content data stored in the first apparatus with the content data to be stored onto the storage medium managed by the second apparatus; and if the storage medium managed by the second apparatus is smaller in capacity than the content data to be transferred from the first apparatus to the second apparatus, then performing a selective transferring process causing the first apparatus preferentially to select content data different from the content data stored on the storage medium managed by the second apparatus and to transfer the preferentially selected content data to the second apparatus.

19 Claims, 13 Drawing Sheets

| | | |
|---|---|---|
| ☑ | 1. | BISTRO IN AUTUMN — SHIRO MINIMISHIMA |
| ☐ | 2. | NYLON KING — SNAP |
| ☐ | 3. | SATOSHI'S FUNDOSHI TUNE — SATOSHI HIKAWA |
| ☐ | 4. | WOULD YOU CELEBRATE? — NAMIKO AFURO |
| ☐ | 5. | KAEDE DROPS — HIKARU HATADA |
| ☐ | 6. | CORN FIELDS — RYOKO MORIKAWA |

[TRANSFER] BT1    [NEXT SCREEN] BT2

CONTENT TRANSFERRING METHOD, TRANSFERRING APPARATUS, AND TRANSFERRING PROGRAM

CROSS REFERENCES TO RELATED APPLICATIONS

The present invention contains subject matter related to Japanese Patent Application JP 2005-045596 filed with the Japanese Patent Office on Feb. 22, 2005, the entire contents of which being incorporated herein by reference.

BACKGROUND OF THE INVENTION

The present invention relates to a content transferring method, a transferring apparatus, and a transferring program. More particularly, the invention relates to a method, an apparatus and a program for transferring music data to a portable reproducing apparatus that may be carried around and utilized by a user.

Recent years have seen the growing popularity of portable reproducing apparatuses each incorporating a hard disk drive that stores music data. A typical apparatus of this type is disclosed illustratively in Japanese Patent Laid-open No. 2001-175624 (corresponding to U.S. Patent No. 2002-159304).

Such portable reproducing apparatus are each connected to a transferring apparatus capable of acquiring music data over the Internet or the like and transferring the acquired data to the connected portable apparatus. The music data transferred from the transferring apparatus is stored onto a hard disk drive inside the portable reproducing apparatus. The transferring apparatus is typically a personal computer, audio equipment, or like gears designed to acquire music data over the Internet.

With music data stored inside, the portable reproducing apparatus is operated by the user for music reproduction typically while being carried around. The music data is then retrieved from the internal hard disk drive, processed for reproduction and output audibly through earphones or the like.

SUMMARY OF THE INVENTION

One disadvantage of the typical portable reproducing apparatus is that every time music data is to be transferred from the transferring apparatus to the portable reproducing apparatus, the user must designate all transfer-destined music data items by manipulating the transferring apparatus. This can be a bothersome, time-consuming chore.

The present invention has been made in view of the above circumstances and provides a content transfer system that makes the task of transferring content data significantly easier than before.

In carrying out the present invention and according to one embodiment thereof, there is provided a content transferring method for use with a first and a second apparatus interconnected by a communicating device, the content transferring method including the steps of: if a storage medium managed by the second apparatus is larger in capacity than content data to be transferred from the first apparatus to the second apparatus, then performing a synchronizing process synchronizing the content data stored in the first apparatus with the content data to be stored onto the storage medium managed by the second apparatus; and if the storage medium managed by the second apparatus is smaller in capacity than the content data to be transferred from the first apparatus to the second apparatus, then performing a selective transferring process causing the first apparatus preferentially to select content data different from the content data stored on the storage medium managed by the second apparatus and to transfer the preferentially selected content data to the second apparatus.

Where the content transferring method of the present invention is in use, if the storage medium managed by the second apparatus is found larger in capacity than the content data to be transferred from the first apparatus to the second apparatus, then a synchronizing process is performed to synchronize the content data stored in the first apparatus with the content data to be stored onto the storage medium managed by the second apparatus. If the storage medium managed by the second apparatus is found smaller in capacity than the content data to be transferred from the first apparatus to the second apparatus, then a selective transferring process is carried out to cause the first apparatus preferentially to select content data different from the content data stored on the storage medium managed by the second apparatus and to transfer the preferentially selected content data to the second apparatus. The inventive method thus eliminates the need for the user to designate each and every music data item to be transferred from the first apparatus to the second apparatus.

That is, with the inventive content transferring method in use, there is no particular need for the user to specify the music data to be transferred from one apparatus to another. The method thus makes the task of transferring content data significantly easier than before.

BRIEF DESCRIPTION OF THE DRAWINGS

Further objects and advantages of the present invention will become apparent upon a reading of the following description and appended drawings in which:

FIG. 15 is a schematic view showing a transfer-destined music designation screen.

DETAILED DESCRIPTION OF THE PREFERRED EMBODIMENTS

One preferred embodiment of the present invention will now be described in detail with reference to the accompanying drawings.

(1) Configuration of the Music Transfer System

Figure 1:
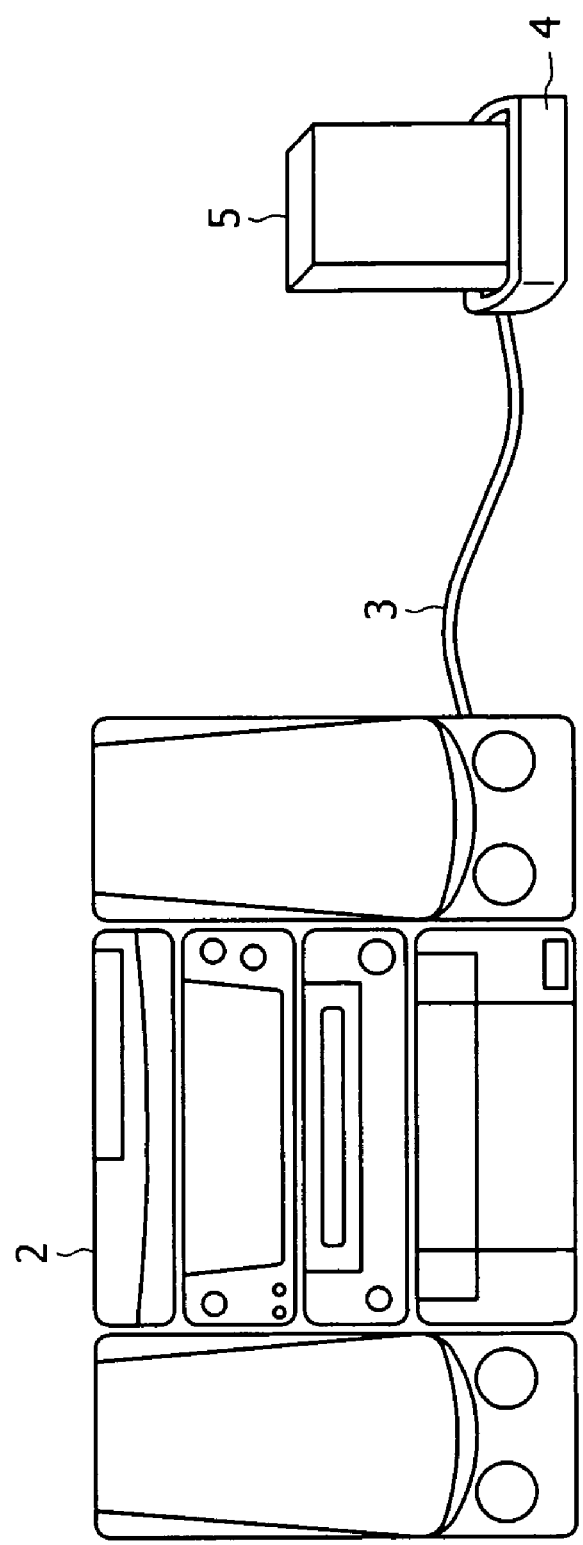
FIG. 1 is a schematic view showing an overall configuration of a music transfer system embodying the present invention.

FIG. 1 shows an overall configuration of a music transfer system 1 embodying the present invention. The music transfer system 1 has a transferring apparatus 2 and a portable reproducing apparatus 5 set in a connecting cradle 4, the transferring apparatus 2 being connected to the portable reproducing apparatus 5 via a connecting cable 3 and the cradle 4 so that the transferring apparatus 2 can transfer externally acquired music data to the portable reproducing apparatus 5. In this embodiment, the transferring apparatus 2 corresponds to audio equipment capable of recording and reproducing music data. It should be noted that the connecting cable 3 may be replaced by a wireless connection arrangement that connects the transferring apparatus 2 wirelessly to the portable reproducing apparatus 5. The wireless connection standard that can be applied here is illustratively Bluetooth, IEEE802.11b, IEEE802.11g, or some other suitable standard.

Figure 2:
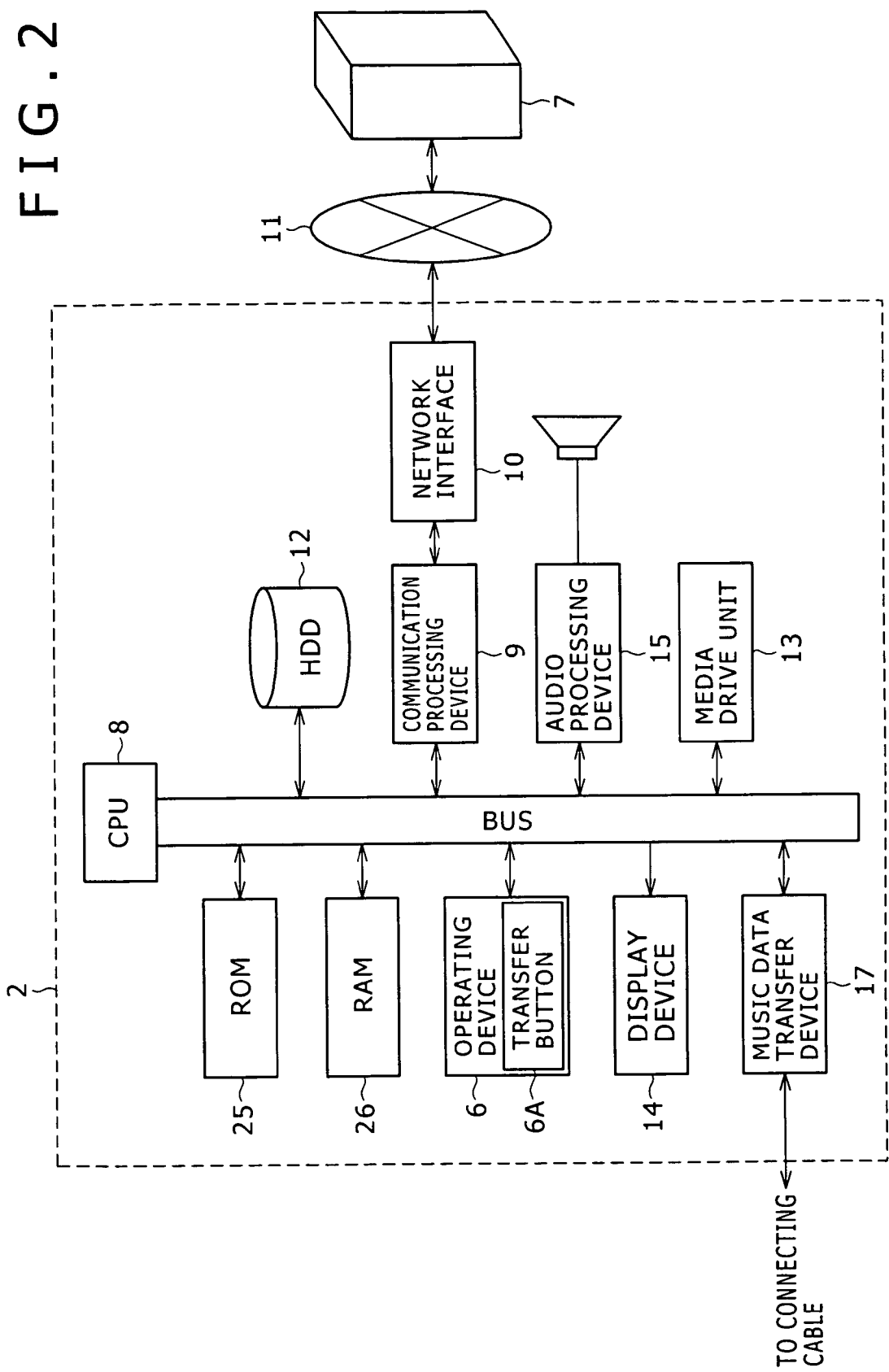
FIG. 2 is a block diagram showing a typical structure of a transferring apparatus as part of the embodiment.

Suppose that an operating device 6 of the transferring apparatus 2 (see FIG. 2) is operated to acquire music data representing a single tune (title) from a music providing server 7. In this case, a CPU (central processing unit) 8 controlling the transferring apparatus 2 as a whole transmits a music data request signal to the music providing server 7 through a communication processing device 9 and a network interface 10 and over the Internet 11. The signal serves to request the music providing server 7 to transmit the music data corresponding to the music data acquiring operation performed on the operating device 6. Upon receipt of the music data request signal, the music providing server 7 sends the requested music data to the transferring apparatus 2 over the Internet 11. At this point, the transferring apparatus 2 receives the music data from the music providing server 7 through the network interface 11 and communication processing device 9, and stores the received music data onto a hard disk drive 12. This is how the transferring apparatus 2 acquires music data from the music providing server 7.

Suppose also that the operating device 6 of the transferring apparatus 2 is operated to acquire music data from a CD (Compact Disc). In this case, the CPU 8 causes a media drive unit 13 to read the music data from the CD of interest loaded in the unit 13 and writes the retrieved music data to the hard disk drive 12. This is how the transferring apparatus 2 acquires music data from the CD. In the description that follows, it is assumed that one music data item corresponds to a single tune (i.e., title).

For this embodiment, it is assumed that the music data items acquired from the music providing server 7 or from CDs are each furnished with corresponding attribute information. The attribute information includes: title information indicating the title of the tune in question; album identification information identifying the album that contains the tune; track number information indicating on which track of the album the tune is stored; artist identification information identifying the artist who plays the tune; and genre identification information identifying the genre of the tune (e.g., pops, jazz, classic). An album in this context illustratively represents a single CD being marketed.

The attribute information per tune may be input manually by the user who operates the operating device 6. Alternatively, when music data is reproduced from a CD by the media drive unit 13, identification information may be generated from the reproduced TOC of the CD or from the retrieved music data under control of the CPU 8, the generated information being transferred to an external server. The attribute information corresponding to the identification information may then be received from the external server through the network interface 10 and communication processing device 9. The received attribute information may be recorded to the hard disk drive 12 in association with the music data that has been read from the CD and stored on the HDD 12 as well. The external server may illustratively CDDB (trademark) servers of Gracenote corporate.

Figure 3:
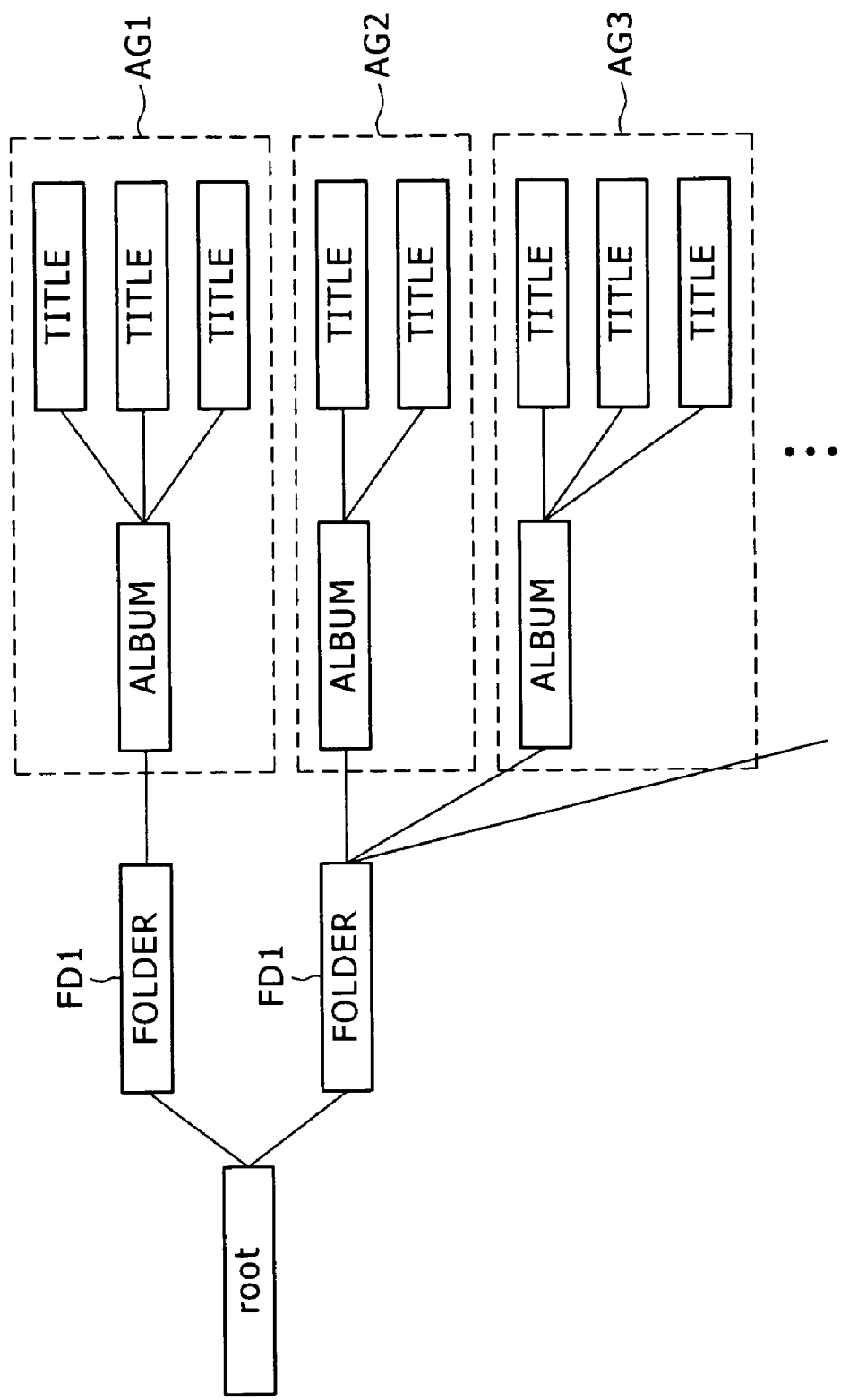
FIG. 3 is a schematic view outlining a directory structure.

After the attribute information is received, the CPU 8 of the transferring apparatus 2 can classify a plurality of music data items stored on the hard disk drive 12 into album-specific groups (or simply called album groups) on the basis of the attribute information associated with each music data item. As a result of the classification, the CPU 8 of the transferring apparatus 2 can display the music data titles illustratively in album groups AG1, AG2, AG3, etc., on a display device 14 as shown in FIG. 3. In this case, the CPU 8 may let the music data titles in the album groups AG1, AG2, AG3, etc., be displayed in order of track number for each album.

In response to the user's operation, the CPU 8 of the transferring apparatus 2 causes illustratively the first album group AG1 to be subsumed under a first folder FD1, the second and the third album groups AG2 and AG3 under a second folder FD2, and so on, for management purposes. That is, the transferring apparatus 2 may have a plurality of album groups AG1, AG2, etc., classified into management units as desired by the user. In the ensuing description, the mode in which music data titles are classified for display under the folders FD1, FD2, etc., will be called folder-classified display mode.

Suppose now that the operating device 6 is operated to designate one of a plurality of titles classified by folder and to reproduce the designated title. In this case, the CPU 8 of the transferring apparatus 2 reads the music data corresponding to the designated title from the hard disk drive 12, subjects the retrieved data to a suitable reproducing process, and supplies an audio processing device 15 with a music signal derived from the process. In turn, the audio processing device 15 outputs from speakers 16 the sounds based on the supplied music signal.

The operating device 6 may also be operated to display the music data titles on an artist-by-artist basis. In that case, the CPU 8 of the transferring apparatus 2 classifies by artist name the plurality of music data items held on the hard disk drive 12, in accordance with the attribute information attached to each music data item. As a result of that classification, the CPU 8 can give a display of the music data titles grouped by artist name on the display device 14. At this point, the CPU 8 of the transferring apparatus 2 provides the artist-by-artist display of the music data titles illustratively in the order in which the titles were acquired. In the description that follows, the mode in which music data titles are classified by artist before being displayed will be called artist-classified display mode.

It is also possible for the CPU 8 of the transferring apparatus 2 to classify by genre the plurality of music data items held on the hard disk drive 12 for display in genre-by-genre fashion on the display device 14, in accordance with the attribute information attached to each music data item. In this case, the CPU 8 gives a genre-by-genre display of the music data titles illustratively in the order in which the titles were acquired. In the ensuing description, the mode in which music data titles are classified by genre before being displayed will be called genre-classified display mode.

The CPU 8 of the transferring apparatus 2 counts as reproduction count information the number of times each music data item held on the hard disk drive 12 has been reproduced and stores that information on the HDD 12. It might then happen that the operating device 6 of the transferring apparatus 2 is operated to acquire what may be called an access top display in which the most frequently reproduced music data titles are preferentially listed in descending order of their reproduction count. In that case, the CPU 8 of the transferring apparatus 2 causes the display device 14 to display the music data titles in descending order of their reproduction count based on the reproduction count information stored on the hard disk drive 12 together with the titles. It might also happen that the operating device 6 of the transferring apparatus 2 is operated to acquire what may be called an access bottom display in which the least frequently reproduced music data titles are preferentially listed in ascending order of their reproduction count. In that case, the CPU 8 of the transferring apparatus 2 causes the display device 14 to display the music data titles in descending order of their reproduction count based on the reproduction count information stored on the hard disk drive 12 together with the titles. In the description that follows, the mode in which music data titles are displayed in descending order of their reproduction count will be called access top display mode; the mode in which music data titles are displayed in ascending order of their reproduction count will be called access bottom display mode.

The CPU 8 of the transferring apparatus 2 records as reproduction date information the date and time of day at which each music data item held on the hard disk drive 12 was reproduced and stores that information on the HDD 12. It might then happen that the operating device 6 of the transferring apparatus 2 is operated to display preferentially the last reproduced music data title. In that case, the CPU 8 causes the display device 14 to display the music data titles in chronological order, with the last reproduced title on top, based on the reproduction date information stored on the hard disk drive 12 together with the titles. In the ensuing description, the mode in which music data tiles are displayed chronologically with the last reproduced item on top will be called last reproduced music preferential display mode.

The CPU 8 of the transferring apparatus 2 records as recording date information the date and time of day at which each music data item held on the hard disk drive 12 was acquired (i.e., recorded) and stores that information on the HDD 12. It might then happen that the operating device 6 of the transferring apparatus 2 is operated to display preferentially the last recorded music data title. In that case, the CPU 8 causes the display device 14 to display the music data titles in chronological order, with the last recorded title on top, based on the recording date information stored on the hard disk drive 12 together with the titles. In the description that follows, the mode in which music data tiles are displayed chronologically with the last recorded title on top will be called last recorded music preferential display mode.

When the operating device 6 is operated by the user to have the system display a list of favorites, the CPU 8 of the transferring apparatus 2 can display on the display device 14 a list of music data titles designated beforehand by the user as preferred titles that are arranged in a desired sequence. In the ensuing description, the mode in which the user's list of favorite titles is displayed will be called favorite list display mode.

It might also happen that the operating device 6 is operated by the user for a server-derived music display operation causing only the music data titles acquired from the music providing server 7 to be displayed. In that case, the CPU 8 of the transferring apparatus 2 selects those music data titles acquired from the music providing server 7 from among the music data items stored on the hard disk drive 12, and displays on the display device 14 the selected music data titles illustratively in the order in which they were acquired. In the description that follows, the mode in which only the music data titles acquired from the music providing server 7 are displayed will be called server-derived music display mode.

When a transfer button 6A is pushed on the display device 6, the CPU 8 of the transferring apparatus 2 carries out what may be called an automatic transferring process. This process involves automatically selecting a plurality of music data items from among those stored on the hard disk drive 12 in accordance with predetermined transfer setting information, and transferring the selected music data items via a music data transfer device 17 and the connecting cable 3 to the portable reproducing apparatus 5 set in the connecting cradle 4. The automatic transferring process will be discussed later in more detail.

Figure 4:
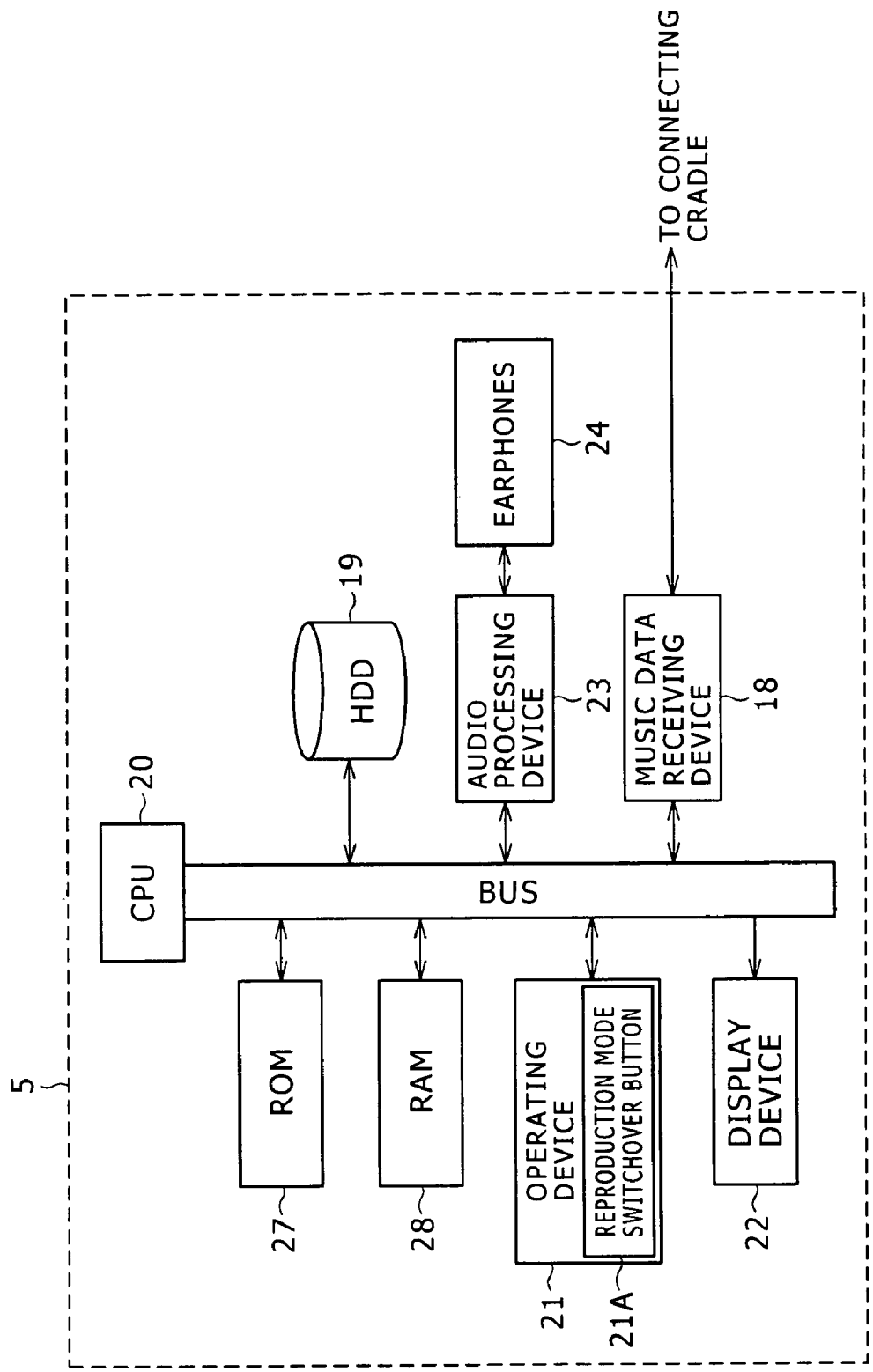
FIG. 4 is a block diagram showing a typical structure of a portable reproducing apparatus as part of the embodiment.

The portable reproducing apparatus 5 (see FIG. 4) set in the connecting cradle 4 receives music data that is transferred from the transferring apparatus 2 via the connecting cable 3 and connecting cradle 4. The transferred music data is received through a music data receiving device 18 and stored onto a hard disk drive 19 inside the apparatus 5.

A CPU 20 provides overall control of the portable reproducing apparatus 5. When the user carrying around the portable reproducing apparatus 5 operates and operating device 21 of the apparatus 5 for a music title display operation, the CPU 20 causes a display device 22 of the apparatus 5 to display the titles of the music data stored on the internal hard disk drive 19, in accordance with music data attribute information also held on the HDD 19.

Suppose that the operating device 21 of the portable reproducing apparatus 5 is operated to designate and reproduce some of the music data titles displayed on the display device 22. In that case, the CPU 20 of the portable reproducing apparatus 5 reads the music data corresponding to the designated title from the hard disk drive 19, subjects the retrieved data to a reproducing process, and supplies a music signal derived from the process to an audio processing device 23. In turn, the audio processing device 23 outputs through earphones 24 the sounds representative of the supplied music signal. The earphones 24 may be replaced by speakers or by headphones as long as they are capable of acting as an electroacoustic transducer.

(2) Automatic Transferring Process

Figure 5:
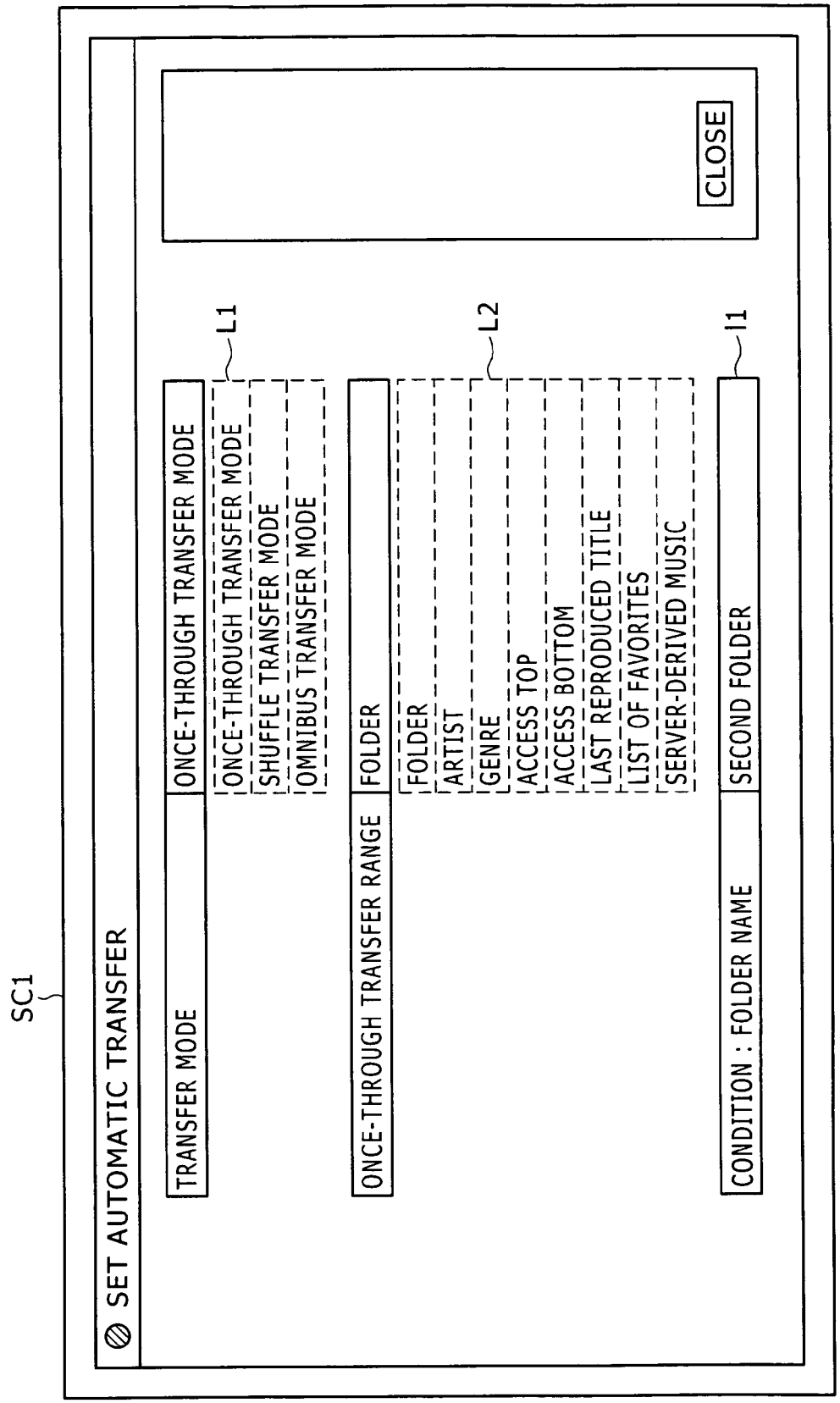
FIG. 5 is a schematic view showing a transfer setting screen.

When the operating device 6 is operated for a setting start operation that starts the setting of an automatic transferring process, the CPU 8 of the transferring apparatus 2 causes the display device 14 to display a transfer setting screen SC1 shown in FIG. 5. The transfer setting screen SC1 indicates a transfer mode selection list L1 that allows the user to designate a desired transfer mode. By manipulating the operating device 6 of the transferring apparatus 2, the user may select one of a plurality of transfer modes such as once-through mode and shuffle transfer mode. Each of these transfer modes is explained below.

(2-1) Once-Through Mode

The operating device 6 of the transferring apparatus 2 may be operated to select "once-through mode" from the transfer mode selection list L1 on the transfer setting screen SC1. In that case, the CPU 8 of the transferring apparatus 2 displays a once-through range selection list L2 that allows the user to select a once-through range, as shown in FIG. 5. The operating device 6 may then be operated to select a "folder" from the once-through transfer range selection list L2. In response, the CPU 8 of the transferring apparatus 2 causes the display device 14 to display an input field 11 in which the user is prompted to input the name of the folder to be transferred. Suppose that the user inputs, say, "second folder" as the transfer-destined folder name in the input field 11. In this case, the CPU 8 of the transferring apparatus 2 generates transfer setting information indicating that "once-through transfer mode" is set as the transfer mode, that "folder" is set as the once-through transfer range, and that "second folder" is set as the transfer-destined folder. The CPU 8 records the generated transfer setting information to the hard disk drive 12.

Thereafter, the transfer button 6A may be pushed on the transferring apparatus 2 with the portable reproducing apparatus 5 placed in the connecting cradle 4. In turn, the CPU 8 of the transferring apparatus 2 references the transfer setting information stored on the hard disk drive 12 and thereby recognizes that "once-through transfer mode" is set as the transfer mode, that "folder" is set as the once-through transfer range, and that "second folder" is set as the transfer-destined folder. As a result of that recognition, the CPU 8 selects a predetermined number of titles in order of title display (e.g., first through N-th titles) from among a plurality of music data items with their corresponding titles shown subsumed under the second folder FD2 in folder-classified display mode in FIG. 3. The CPU 8 proceeds automatically to transfer the music data items representative of the selected titles to the portable reproducing apparatus 5. At the same time, the CPU 8 of the transferring apparatus 2 recognizes as next transfer starting music data the first of the music data titles to be transferred next time in order of title display except for the titles that have been transferred this time, from among the plurality of music data titles shown subsumed under the second folder FD2 in folder-classified display mode. The CPU 8 then stores onto the hard disk drive 12 next transfer starting music data identification information for identifying the first music data title to be transferred next time.

After the portable reproducing apparatus 5 has been removed from the connecting cradle 4 for some time, the apparatus may again be positioned in the cradle 4 and the transfer button 6A may be operated on the transferring apparatus 2. In that case, the CPU 8 of the transferring apparatus 2 references the transfer setting information stored on the hard disk drive 12 and thereby recognizes that "once-through transfer mode" is set as the transfer mode, that "folder" is set as the once-through transfer range, and that "second folder" is set as the transfer-destined folder. By referencing the next transfer starting music data identification information also held on the hard disk drive 12, the CPU 8 recognizes the first music data title to be transferred next time. The CPU 8 of the transferring apparatus 2 then selects a predetermined number of titles in order of title display (e.g., (N+1)th through 2N-th titles) subsequent to the recognized next transfer starting music data, the titles being displayed in a manner subsumed under the second folder FD2 in folder-classified display mode. The CPU 8 proceeds automatically to transfer the music data items constituting the selected titles to the portable reproducing apparatus 5. At the same time, as described above, the CPU 8 of the transferring apparatus 2 recognizes next transfer starting music data identification information identifying the first of the music data titles to be transferred next time except for the already transferred music data items including those that have been transferred this time from among the plurality of music data titles displayed in a manner subsumed under the second folder FD2 in folder-classified display mode. On the basis of that recognition, the CPU 8 updates on the hard disk drive 12 the next transfer starting music data identification information for identifying the first music data title to be transferred next time.

As described, with the portable reproducing apparatus 5 placed in the connecting cradle 4, every time the transfer button 6A is pushed, the transferring apparatus 2 set in once-through mode selects a predetermined number of titles in order of title display from among a plurality of music data titles subsumed under the user-designated second folder FD2, except for the titles having been transferred already. The CPU 8 proceeds automatically to transfer the music data items constituting the selected titles to the portable reproducing apparatus 5 via the connecting cable 3 and connecting cradle 4. By simply placing the apparatus 5 in its connecting cradle 4 and then pushing the transfer button 6A of the transferring apparatus 2, the user can transfer a plurality of music data titles in order of title display from under the predetermined second folder FD2 to the portable reproducing apparatus 5 in "once-through" fashion. This makes the task of transferring music data appreciably easier than before.

Suppose that the transferring apparatus 2 placed in once-through mode has "artist" set to replace "folder" as the once-through transfer range and has, say, "Afro Smith" established as the artist whose titles are to be transferred. In that case, every time the transfer button is pushed, the transferring apparatus 2 selects a predetermined number of music data titles in order of title display from among a plurality of music data titles grouped and displayed under the heading of the artist "Afro Smith" in artist-classified display mode, except for the titles having been transferred already. The transferring apparatus 2 automatically transfers the selected music data titles to the portable reproducing apparatus 5 via the connecting cable 3 and connecting cradle 4.

It might also happen that the transferring apparatus 2 placed in once-through mode has "genre" set as the once-through transfer range and has "rock" established as the transfer-destined genre. In that case, every time the transfer button is pushed, the transferring apparatus 2 selects a predetermined number of music data titles in order of title display from among a plurality of music data titles grouped and displayed under heading of the genre "rock" in genre-classified display mode, except for the titles having been transferred already. The transferring apparatus 2 automatically transfers the selected music data titles to the portable reproducing apparatus 5 via the connecting cable 3 and connecting cradle 4.

Suppose also that the transferring apparatus 2 placed in once-through mode has "access top" established as the once-through transfer range. In that case, every time the transfer button is pushed, the transferring apparatus 2 selects a predetermined number of music data titles in order of title display from among a plurality of music data titles displayed in access top display mode, except for the titles having been transferred already. The transferring apparatus 2 then transfers automatically the selected music data titles to the portable reproducing apparatus 5 via the connecting cable 3 and connecting cradle 4.

It might happen that the transferring apparatus 2 placed in once-through mode has "access bottom" established as the once-through transfer range. In that case, every time the transfer button is pushed, the transferring apparatus 2 selects a predetermined number of music data titles in order of title display from among a plurality of music data titles displayed in access bottom display mode, except for the titles having been transferred already. The transferring apparatus 2 then transfers automatically the selected music data titles to the portable reproducing apparatus 5 via the connecting cable 3 and connecting cradle 4.

Suppose also that the transferring apparatus 2 placed in once-through mode has "last reproduced title" established as the once-through transfer range. In that case, every time the transfer button is pushed, the transferring apparatus 2 selects a predetermined number of music data titles in order of title display from among a plurality of music data titles displayed in last reproduced music preferential transfer mode, except for the titles having been transferred already. The transferring apparatus 2 then transfers automatically the selected music data titles to the portable reproducing apparatus 5 via the connecting cable 3 and connecting cradle 4.

It might happen that the transferring apparatus 2 placed in once-through mode has "list of favorites" set as the once-through transfer range. In that case, every time the transfer button is pushed, the transferring apparatus 2 selects a predetermined number of music data titles in order of title display from among a plurality of music data titles displayed in favorite list display mode, except for the titles having been transferred already. The transferring apparatus 2 automatically transfers the selected music data titles to the portable reproducing apparatus 5 via the connecting cable 3 and connecting cradle 4.

It might also happen that the transferring apparatus 2 placed in once-through mode has "server-derived music" established as the once-through transfer range. In that case, every time the transfer button is pushed, the transferring apparatus 2 selects a predetermined number of music data titles in order of title display from among a plurality of music data titles displayed in server-derived music display mode, except for the titles having been transferred already. The transferring apparatus 2 then transfers automatically the selected music data titles to the portable reproducing apparatus 5 via the connecting cable 3 and connecting cradle 4.

Figure 6:
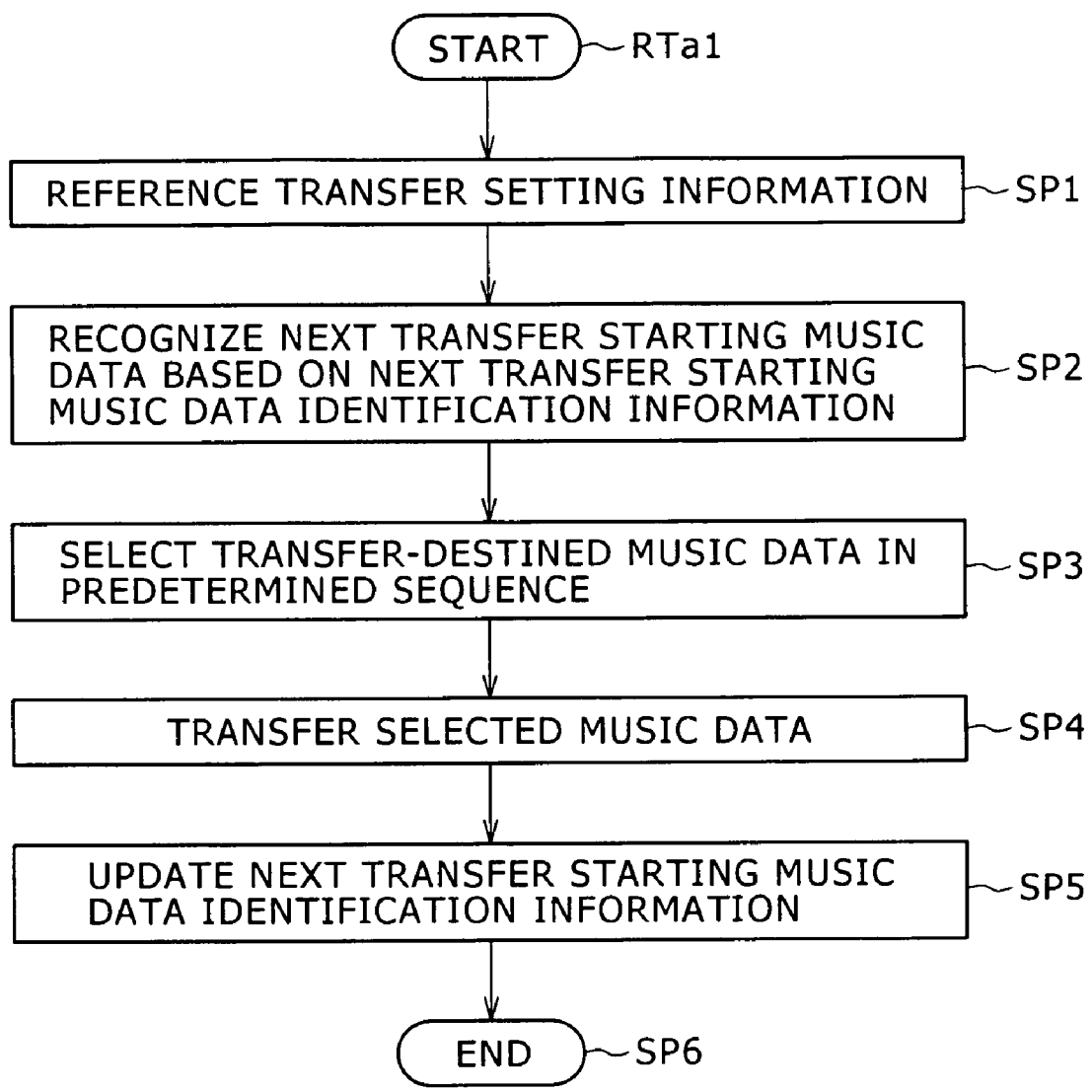
FIG. 6 is a flowchart of steps constituting an automatic transferring procedure in once-through transfer mode.

How an automatic transferring procedure RTa1 is performed in once-through mode will now be described with reference to the flowchart of FIG. 6.

With the portable reproducing apparatus 5 placed again in the connecting cradle 4, pushing the transfer button 6A of the transferring apparatus 2 causes the CPU 8 of the apparatus 2 to reach step SP1. In step SP1, the CPU 8 references the transfer setting information stored on the hard disk drive 12 and thereby recognizes the settings of "once-through mode" as the transfer mode, "folder" as the once-through range, and "second folder" as the transfer-destined folder.

In step SP2, the CPU 8 of the transferring apparatus 2 references the next transfer starting music data identification information stored on the hard disk drive 12 and thereby recognizes the next transfer starting music data.

In step SP3, the CPU 8 of the transferring apparatus 2 selects a predetermined number of music data titles in order of title display from among a plurality of music data titles grouped and displayed under the heading of the second folder FD2 in folder-classified display mode, the selected titles starting from the recognized next transfer starting music data.

In step SP4, the CPU 8 of the transferring apparatus 2 transfers the music data constituting the selected titles to the portable reproducing apparatus 5 via the connecting cable 3 and connecting cradle 4.

In step SP5, the CPU 8 of the transferring apparatus 2 has a plurality of music data titles displayed in a manner subsumed under the second folder FD2 in folder-classified display mode, and recognizes as the next transfer starting music data the first of the titles to be transferred in order of title display except for the already transferred music data titles including those transferred this time. Following that recognition, the CPU 8 updates the next transfer starting music data identification information stored on the hard disk drive 12 before reaching step SP6. In step SP6, the CPU 8 terminates the automatic transferring procedure RTa1.

As described, with the portable reproducing apparatus 5 placed in the connecting cradle 4, pushing the transfer button 6A of the transferring apparatus 2 causes the apparatus 2 to select a plurality of music data titles in a predetermined sequence from among a plurality of music data titles stored on the hard disk drive 12 except for the titles having been transferred already. The transferring apparatus 2 is further caused automatically to transfer the selected music data titles to the portable reproducing apparatus 5.

The user is thus exempt from performing the chore of manually designating music data titles to be transferred to the portable reproducing apparatus 5. This makes the task of music data transfer appreciably easier for the user than before.

By carrying out the procedure above, the transferring apparatus 2 selects a plurality of music data titles in a predetermined sequence from among a plurality of music data titles stored on the hard disk drive 12 except for the titles having been transferred already, and automatically transfers the selected music data titles to the portable reproducing apparatus 5. There is no need for the user to do the chore of manually designating music data titles to be transferred to the portable reproducing apparatus 5. As a result, the task of music data transfer is made significantly easier than before.

In the foregoing description, the transferring apparatus 2 was shown to select a predetermined number of music data titles in order of title display and to transfer the selected titles to the portable reproducing apparatus 5 when the transfer button 6A was pushed. Alternatively, when the transfer button 6A is pushed, the CPU 8 of the transferring apparatus 2 may access the portable reproducing apparatus 5 via the connecting cable 3 and connecting cradle 4 to recognize a free storage capacity of the hard disk drive 19 inside the portable apparatus 5. The CPU 8 may then select in order of title display an appropriate number of music data titles commensurate with the recognized free storage capacity and may transfer the selected titles to the portable reproducing apparatus 5.

(2-2) Shuffle Transfer Mode

Figure 7:
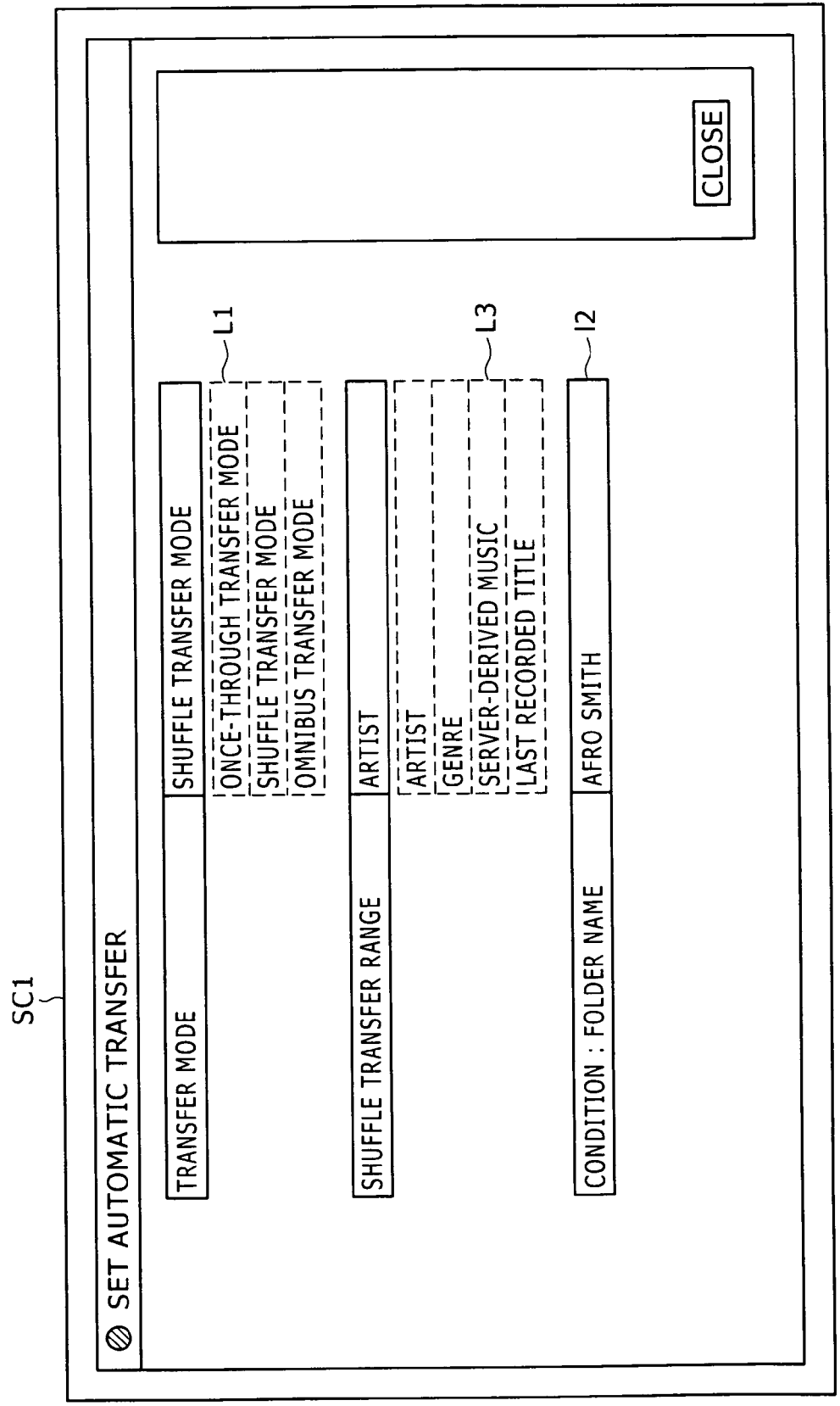
FIG. 7 is a schematic view showing another transfer setting screen.

When the operating device 6 of the transferring apparatus 2 is operated to select "shuffle transfer mode" from the transfer mode selection list L1 on the transfer setting screen SC1, the CPU 8 of the transferring apparatus 2 displays a shuffle transfer range selection list L3 that allows the user to designate a desired shuffle transfer range as shown illustratively in FIG. 7. The operating device 6 of the transferring apparatus 2 may then be operated to select, say, "artist" from the shuffle transfer range selection list L3. In that case, the CPU 8 of the transferring apparatus 2 causes the display device 14 to display an input field 12 in which the user is prompted to input the name of the artist whose titles are desired to be transferred. Suppose now that the user operates the operating device 6 of the transferring apparatus 2 to input "Afro Smith" in the input field 12 as the name of the transfer-destined artist. In response, the CPU 8 of the transferring apparatus 2 generates transfer setting information indicating that "shuffle transfer mode" is set as the transfer mode, "artist" as the shuffle transfer range, and "Afro Smith" as the transfer-destined artist, and stores the generated transfer setting information onto the hard disk drive 12.

Thereafter, with the portable reproducing apparatus 5 positioned in the connecting cradle 4, pushing the transfer button 6A of the transferring apparatus 2 causes the CPU 8 of the apparatus 2 to reference the transfer setting information held on the hard disk drive 12 and thereby recognize that "shuffle transfer mode" is set as the transfer mode, "artist" as the shuffle transfer range, and "Afro Smith" as the transfer-destined artist. Based on that recognition, the CPU 8 of the transferring apparatus 2 selects randomly a predetermined number of music data titles from a plurality of music data titles grouped and displayed under the heading of the artist name "Afro Smith" in artist-classified display mode, and transfers automatically the music data constituting the selected titles to the portable reproducing apparatus 5. At the same time, the CPU 8 of the transferring apparatus 2 stores onto the hard disk drive 12 transfer history information by which to recognize the music data transferred this time as a history.

The portable reproducing apparatus 5 detached earlier from the connecting cradle 4 may again be placed in the cradle 4 and the transfer button 6A of the transferring apparatus 2 may then be pushed. In response, the CPU 8 of the transferring apparatus 2 references the transfer setting information stored on the hard disk drive 12 and thereby recognizes that "shuffle transfer mode" is set as the transfer mode, "artist" as the shuffle transfer range, and "Afro Smith" as the transfer-destined artist. At the same time, the CPU 8 references the transfer history information held on the hard disk drive 12 to recognize the already transferred music data. The CPU 8 of the transferring apparatus 2 then selects randomly a predetermined number of music data titles from among a plurality of music data titles grouped and displayed under the heading of the artist "Afro Smith" in artist-classified display mode, except for the already transferred music data. The CPU 8 proceeds to transfer automatically the music data constituting the selected titles to the portable reproducing apparatus 5. At this point, the CPU 8 of the transferring apparatus 2 updates the transfer history information held on the hard disk drive 12 in such a manner that the music data transferred this time is included as part of the history.

As described, with the portable reproducing apparatus 5 placed in the connecting cradle 4, every time the transfer button 6A is pushed, the transferring apparatus 2 in shuffle transfer mode selects randomly a predetermined number of music data titles from among a plurality of music data titles grouped and displayed under the heading of the user-designated artist "Afro Smith," except for the already transferred music data titles. The transferring apparatus 2 automatically transfers the selected music data titles to the portable reproducing apparatus 5 via the connecting cable 3 and connecting cradle 4. By simply placing the apparatus 5 in its connecting cradle 4 and then pushing the transfer button 6A of the transferring apparatus 2, the user can transfer the predetermined number of randomly selected music data titles from under the heading of the user-designated artist "Afro Smith" to the portable reproducing apparatus 5 in "once-through" fashion. This makes the task of transferring music data appreciably easier than before.

It might happen that the transferring apparatus 2 placed in shuffle transfer mode has "genre" set to replace "artist" as the shuffle transfer range and has "rock" established as the transfer-destined genre. In that case, every time the transfer button is pushed, the transferring apparatus 2 selects randomly a predetermined number of music data titles from among a plurality of music data titles grouped and displayed under the heading of the genre "rock" in genre-classified display mode, except for the titles having been transferred already. The transferring apparatus 2 automatically transfers the selected music data titles to the portable reproducing apparatus 5 via the connecting cable 3 and connecting cradle 4.

It might also happen that the transferring apparatus 2 placed in shuffle transfer mode has "server-derived music" set as the shuffle transfer range. In that case, every time the transfer button is pushed, the transferring apparatus 2 selects randomly a predetermined number of music data titles from among a plurality of music data titles displayed in server-derived music display mode, except for the titles having been transferred already. The transferring apparatus 2 automatically transfers the selected music data titles to the portable reproducing apparatus 5 via the connecting cable 3 and connecting cradle 4.

Furthermore, it might happen that the transferring apparatus 2 placed in shuffle transfer mode has "last recorded title" set as the shuffle transfer range. In that case, every time the transfer button is pushed, the transferring apparatus 2 selects randomly a predetermined number of music data titles from among a plurality of music data titles displayed in last recorded music preferential display mode, except for the titles having been transferred already. The transferring apparatus 2 automatically transfers the selected music data titles to the portable reproducing apparatus 5 via the connecting cable 3 and connecting cradle 4.

Figure 8:
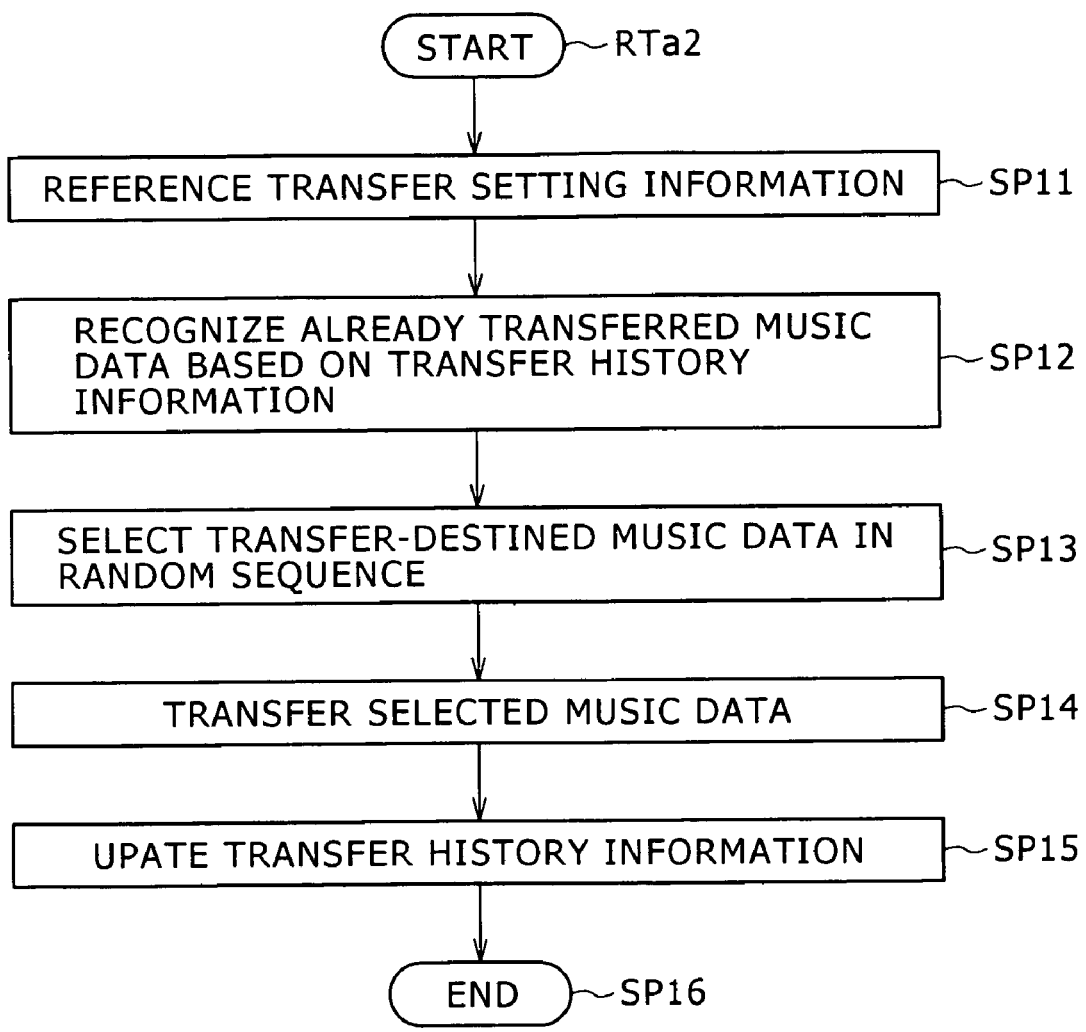
FIG. 8 is a flowchart of steps constituting an automatic transferring procedure in shuffle transfer mode.

How an automatic transferring procedure RTa2 is performed in shuffle transfer mode will now be described with reference to the flowchart of FIG. 8.

With the portable reproducing apparatus 5 placed in the connecting cradle 4, pushing the transfer button 6A of the transferring apparatus 2 causes the CPU 8 of the apparatus 2 to reach step SP11. In step SP11, the CPU 8 references the transfer setting information stored on the hard disk drive 12 and thereby recognizes the settings of "shuffle transfer mode" as the transfer mode, "artist" as shuffle transfer range, and "Afro Smith" as the transfer-destined artist.

In step SP12, the CPU 8 of the transferring apparatus 2 references the transfer history information stored on the hard disk drive 12 and thereby recognizes the already transferred music data.

In step SP13, the CPU 8 of the transferring apparatus 2 selects randomly a predetermined number of music data titles grouped and displayed under the heading of the artist "Afro Smith" in artist-classified display mode, except for the already transferred music data titles.

In step SP14, the CPU 8 of the transferring apparatus 2 transfers the music data constituting the selected titles to the portable reproducing apparatus 5 via the connecting cable 3 and connecting cradle 4.

In step SP15, the CPU 8 of the transferring apparatus 2 updates the transfer history information held on the hard disk drive 12 in such a manner that the music data transferred this time is included as part of the history. Following the update, the CPU 8 reaches step SP16 and terminates the automatic transferring procedure RTa2.

As described, with the portable reproducing apparatus 5 placed in the connecting cradle 4, pushing the transfer button 6A of the transferring apparatus 2 causes the apparatus 2 to select randomly a plurality of music data titles from among a plurality of music data titles stored on the hard disk drive 12 except for the titles having been transferred already. The transferring apparatus 2 is further caused automatically to transfer the selected music data titles to the portable reproducing apparatus 5.

The user is thus freed from performing the chore of manually designating music data titles to be transferred to the portable reproducing apparatus 5. This makes the task of music data transfer appreciably easier for the user than before.

By carrying out the procedure above, the transferring apparatus 2 randomly selects a plurality of music data titles from among a plurality of music data titles stored on the hard disk drive 12 except for the titles having been transferred already, and automatically transfers the selected music data titles to the portable reproducing apparatus 5. There is no need for the user to do the chore of manually designating music data titles to be transferred to the portable reproducing apparatus 5. As a result, the task of music data transfer is made significantly easier than before.

In the foregoing description, the transferring apparatus 2 was shown to select randomly a predetermined number of music data titles and to transfer the selected titles to the portable reproducing apparatus 5 when the transfer button 6A was pushed. Alternatively, when the transfer button 6A is pushed, the CPU 8 of the transferring apparatus 2 may access the portable reproducing apparatus 5 via the connecting cable 3 and connecting cradle 4 to recognize a free storage capacity of the hard disk drive 19 inside the portable apparatus 5. The CPU 8 may then select an appropriate number of music data titles commensurate with the recognized free storage capacity and may transfer the selected titles to the portable reproducing apparatus 5.

(2-3) Omnibus Transfer Mode

When the operating device 6 of the transferring apparatus 2 is operated to select "omnibus transfer mode" from the transfer mode selection list L1 on the transfer setting screen SC1, the CPU 8 of the transferring apparatus 2 generates transfer setting information indicating that "omnibus transfer mode" is set as the transfer mode and stores the generated transfer setting information onto the hard disk drive 12.

Thereafter, the transfer button 6A may be pushed on the transferring apparatus 2 with the portable reproducing apparatus 5 placed in the connecting cradle 4. In turn, the CPU 8 of the transferring apparatus 2 references the transfer setting information stored on the hard disk drive 12 and thereby recognizes that "omnibus transfer mode" is set as the transfer mode. As a result of that recognition, the CPU 8 first classifies the music data titles stored on the hard disk drive 12 under the headings of artists on the basis of the attribute information associated with the music data titles. The CPU 8 of the transferring apparatus 2 proceeds to select one title per artist from among a plurality of music data titles classified by artist and to transfer automatically the selected music data titles to the portable reproducing apparatus 5 via the connecting cable 3 and connecting cradle 4. At the same time, the CPU 8 stores onto the hard disk drive 12 the transfer history information by which to recognize the music data transferred this time as a history.

After the portable reproducing apparatus 5 has been removed from the connecting cradle 4 for some time, the apparatus may again be positioned in the cradle 4 and the transfer button 6A may be operated on the transferring apparatus 2. In that case, the CPU 8 of the transferring apparatus 2 references the transfer setting information stored on the hard disk drive 12 and thereby recognizes that "omnibus transfer mode" is set as the transfer mode. By referencing the transfer history information held on the hard disk drive 12, the CPU 8 of the transferring apparatus 2 recognizes the already transferred music data titles. The CPU 8 proceeds to select one title per artist from among music data titles classified by artist except for the already transferred titles and to transfer the selected music data titles to the portable reproducing apparatus 5 via the connecting cable 3 and connecting cradle 4. At this point, the CPU 8 of the transferring apparatus 2 updates the transfer history information held on the hard disk drive 12 in such a manner that the music data transferred this time is included as part of the history.

As described, with the portable reproducing apparatus 5 placed in the connecting cradle 4, every time the transfer button 6A is pushed, the transferring apparatus 2 in omnibus transfer mode selects one title per artist from among a plurality of music data titles classified under the headings of the artists, except for the already transferred music data titles. The transferring apparatus 2 automatically transfers the selected music data to the portable reproducing apparatus 5 via the connecting cable 3 and connecting cradle 4. By simply placing the portable reproducing apparatus 5 in its connecting cradle 4 and then pushing the transfer button 6A of the transferring apparatus 2, the user can transfer the music data titles that contain one title of every artist to the portable reproducing apparatus 5. This makes the task of transferring music data appreciably easier than before.

Figure 9:
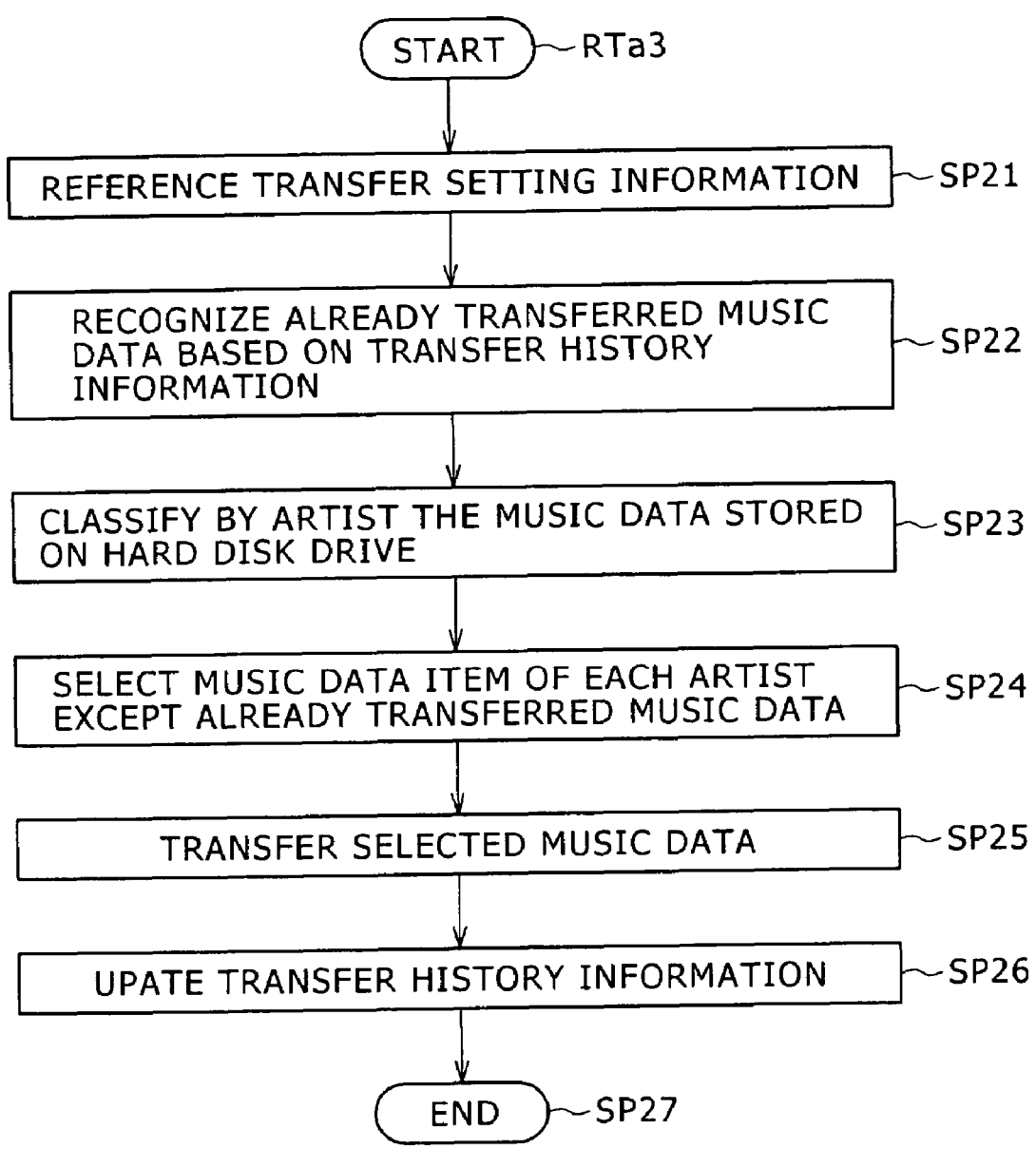
FIG. 9 is a flowchart of steps constituting an automatic transferring procedure in omnibus transfer mode.

How an automatic transferring procedure RTa3 is performed in omnibus transfer mode will now be described with reference to the flowchart of FIG. 9.

With the portable reproducing apparatus 5 placed in the connecting cradle 4, pushing the transfer button 6A of the transferring apparatus 2 causes the CPU 8 of the apparatus 2 to reach step SP21. In step SP21, the CPU 8 references the transfer setting information stored on the hard disk drive 12 and thereby recognizes that "omnibus transfer mode" is set as the transfer mode.

In step SP22, the CPU 8 of the transferring apparatus 2 references the transfer history information stored on the hard disk drive 12 and thereby recognizes all already transferred music data.

In step SP23, the CPU 8 of the transferring apparatus 2 classifies the music data titles stored on the hard disk drive 12 under the headings of artists in accordance with the attribute information associated with the music data titles.

In step SP24, the CPU 8 of the transferring apparatus selects one title per artist from among a plurality of music data titles classified by artist and transfers automatically the selected music data titles to the portable reproducing apparatus 5 via the connecting cable 3 and connecting cradle 4.

In step SP25, the CPU 8 of the transferring apparatus 2 automatically transfers the selected music data to the portable reproducing apparatus 5 via the connecting cable 3 and connecting cradle 4.

In step SP26, the CPU 8 updates the transfer history information held on the hard disk drive 12 in such a manner that the music data transferred this time is included as part of the history. After the update, CPU 8 reaches step SP27 and terminates the automatic transferring procedure RTa3.

As described, with the portable reproducing apparatus 5 placed in the connecting cradle 4, pushing the transfer button 6A of the transferring apparatus 2 in omnibus transfer mode causes the apparatus 2 to select one title per artist from among a plurality of music data titles classified under the headings of the artists. The transferring apparatus 2 is further caused to transfer the selected music data to the portable reproducing apparatus 5.

The user is thus freed from performing the chore of manually designating music data titles to be transferred to the portable reproducing apparatus 5. This makes the task of music data transfer appreciably easier for the user than before.

By carrying out the above procedure, the transferring apparatus 2 selects one title per artist from among a plurality of music data titles classified under the headings of the artists, and automatically transfers the selected music data to the portable reproducing apparatus 5. There is no need for the user to do the chore of manually designating music data titles to be transferred to the portable reproducing apparatus 5. As a result, the task of music data transfer is made significantly easier than before.

In the foregoing description, the transferring apparatus 2 was shown to select one title per artist from among a plurality of music data titles classified under the headings of the artists except for the already transferred music data titles. Alternatively, the transferring apparatus 2 may be arranged to select a predetermined number of music data titles (e.g., 2 titles) per artist.

(3) Preferential Automatic Transferring Process

The transferring apparatus 2 embodying the present invention is also arranged to perform a preferential automatic transferring process for preferentially transferring the music data according to predetermined preferential transfer setting information, the process being carried out in place of the above-described automatic transferring process RTa (1 through 3) for transferring music data.

There are three modes in which to perform the preferential automatic transferring process: frequently reproduced music preferential transfer mode, last reproduced music preferential transfer mode, and newly recorded music preferential transfer mode. Frequently reproduced music preferential transfer mode is a mode in which the music data reproduced frequently by the transferring apparatus 2 is transferred preferentially. Last reproduced music preferential transfer mode is a mode in which the music data last reproduced by the transferred apparatus 2 before its transfer button was pushed is transferred preferentially together with the other music data constituting the same album to which the last reproduced music data belongs. Newly recorded music preferential transfer mode is a mode in which the music data newly recorded (i.e., acquired) by the transferring apparatus 2 since the last music data transfer to the portable reproducing apparatus 5 is transferred preferentially.

The above-outlined three modes in which to perform the preferential automatic transferring process will now be described individually in detail.

(3-1) Frequently Reproduced Music Preferential Transfer Mode

The operating device 6 of the transferring apparatus 2 may be operated to transfer preferentially the music data reproduced frequently by the transferring apparatus 2. In that case, the CPU 8 of the transferring apparatus 2 generates preferential transfer setting information indicating that frequently reproduced music preferential transfer mode is established. The CPU 8 proceeds to store the generated preferential transfer setting information onto the hard disk drive 12.

Thereafter, the transfer button 6A may be pushed on the transferring apparatus 2 with the portable reproducing apparatus 5 placed in the connecting cradle 4. In turn, before performing the automatic transferring process RTa, the CPU 8 of the transferring apparatus 2 references the preferential transfer setting information stored on the hard disk drive 12 and thereby recognizes that frequently reproduced music preferential transfer mode is in effect. As a result of that recognition, the CPU 8 of the transferring apparatus 2 selects the music data frequently reproduced (e.g., 50 times or more) by the apparatus 2 from among a plurality of music data items stored on the hard disk drive 12, the selection being made according to reproduction count information also held on the HDD 12. The CPU 8 then transfers automatically the selected music data to the portable reproducing apparatus 5 via the connecting cable 3 and connecting cradle 4.

As described, with the portable reproducing apparatus 5 placed in the connecting cradle 4, pushing the transfer button 6A of the transferring apparatus 2 causes the apparatus 2 to select the music data frequently reproduced by the apparatus 2 in preference to the music data to be transferred by the automatic transferring process RTa. The transferring apparatus 2 is further caused to transfer the selected music data to the portable reproducing apparatus 5.

Figure 10:
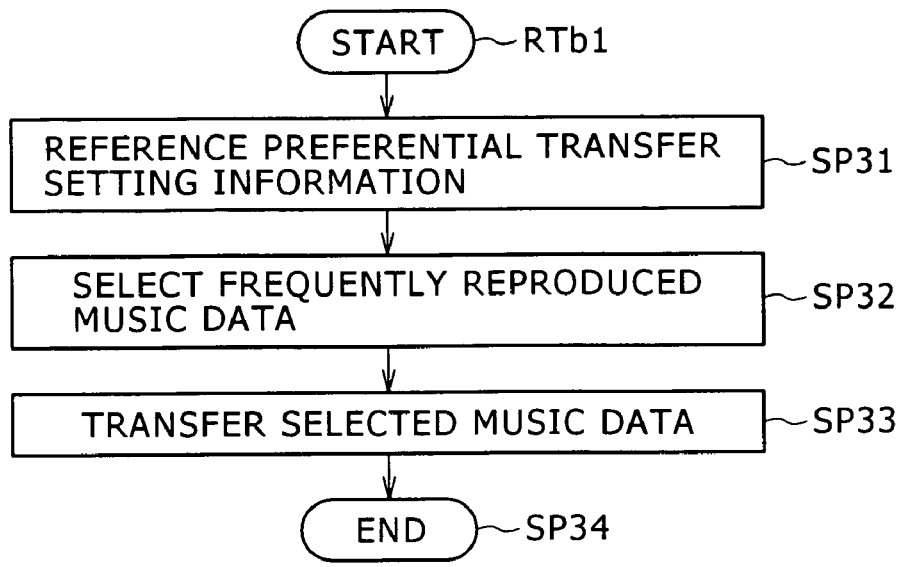
FIG. 10 is a flowchart of steps constituting a preferential automatic transferring procedure in frequently reproduced music preferential transfer mode.

How a preferential automatic transferring procedure RTb1 is performed in frequently reproduced music preferential transfer mode will now be described with reference to the flowchart of FIG. 10.

With the portable reproducing apparatus 5 placed in the connecting cradle 4, pushing the transfer button 6A of the transferring apparatus 2 causes the CPU 8 of the apparatus 2 to reach step SP31. In step SP31, before executing the automatic transferring process RTa, the CPU 8 references the preferential transfer setting information stored on the hard disk drive 12 and thereby recognizes that frequently reproduced music preferential transfer mode is currently established.

With frequently reproduced music preferential transfer mode found in effect, the CPU 8 of the transferring apparatus 2 goes to step SP32. In step SP32, the CPU 8 selects the music data frequently reproduced (e.g., 50 times or more) by the transferring apparatus 2 from among a plurality of music data items stored on the hard disk drive 12, the selection being made according to the reproduction count information also held on the HDD 12.

In step SP33, the CPU 8 of the transferring apparatus 2 transfers automatically the selected music data to the portable reproducing apparatus 5 via the connecting cable 3 and connecting cradle 4. After the data transfer, the CPU 8 reaches step SP34 and terminates the preferential automatic transferring procedure RTb1.

(3-2) Last Reproduced Music Preferential Transfer Mode

The operating device 6 of the transferring apparatus 2 may be operated to transfer preferentially the music data last reproduced by the transferred apparatus 2 before its transfer button was pushed, together with the other music data constituting the same album to which the last reproduced music data belongs. In that case, the CPU 8 of the transferring apparatus 2 generates preferential transfer setting information indicating that last reproduced music preferential transfer mode is established. The CPU 8 proceeds to store the generated preferential transfer setting information onto the hard disk drive 12.

Thereafter, the transfer button 6A may be pushed on the transferring apparatus 2 halfway through music data reproduction by the apparatus 2, with the portable reproducing apparatus 5 placed in the connecting cradle 4. In turn, before performing the automatic transferring process RTa, the CPU 8 of the transferring apparatus 2 references the preferential transfer setting information stored on the hard disk drive 12 and thereby recognizes that last reproduced music preferential transfer mode is currently established. With last reproduced music preferential transfer mode found in effect, the CPU 8 of the transferring apparatus 2 recognizes the album that contains the music data last reproduced by the apparatus 2 before its transfer button was pushed, in accordance with the attribute information associated with the last reproduced music data. The CPU 8 of the transferring apparatus 2 proceeds to select the last reproduced music data as well as the other music data constituting the album recognized in keeping with the attribute information associated with the stored music data. The CPU 8 then transfers automatically all selected music data to the portable reproducing apparatus 5 via the connecting cable 3 and connecting cradle 4.

As described, with the portable reproducing apparatus 5 placed in the connecting cradle 4 and with the transferring apparatus 2 set in last reproduced music preferential transfer mode, pushing the transfer button 6A of the transferring apparatus 2 causes the apparatus 2 to transfer the music data last reproduced by the apparatus 2 before its transfer button was pushed along with the other music data belonging to the same album containing the last reproduced music data, in preference to the music data to be transferred by the automatic transferring process RTa. This allows the user to continue listening to the music last reproduced by the transferring apparatus 2 before its transfer button was operated, by means of the portable reproducing apparatus 5 while the user is, say, on the road.

Figure 11:
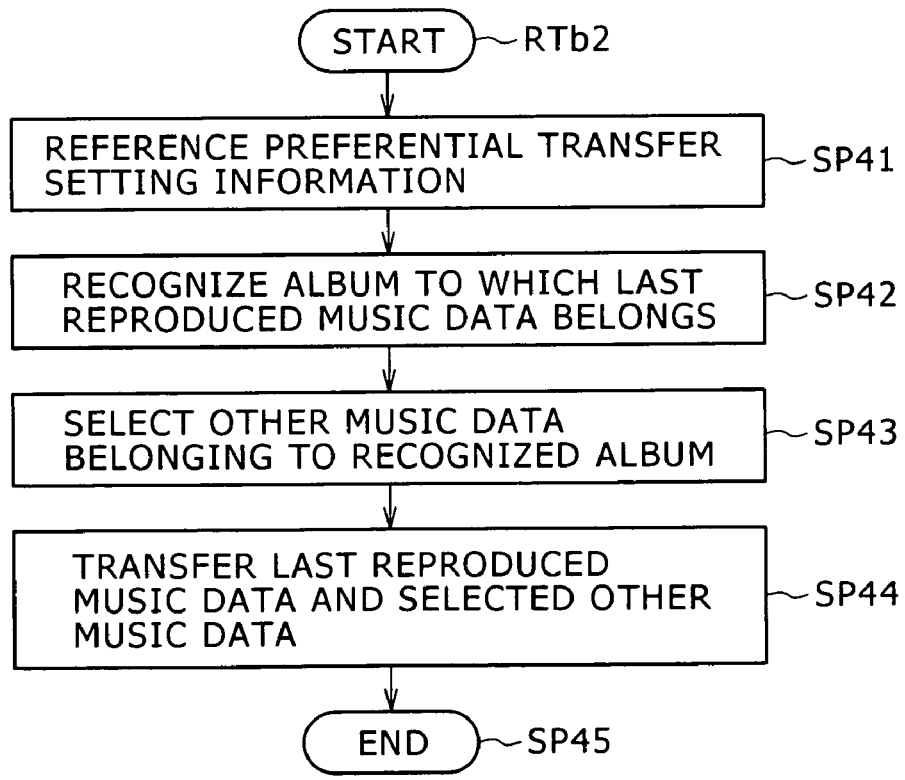
FIG. 11 is a flowchart of steps constituting a preferential automatic transferring procedure in last reproduced music preferential transfer mode.

How a preferential automatic transferring procedure RTb2 is performed in last reproduced music preferential transfer mode will now be described with reference to the flowchart of FIG. 11.

Illustratively, with the portable reproducing apparatus 5 placed in the connecting cradle 4, the transfer button 6A is pushed on the transferring apparatus 2 halfway through its music data reproduction. In turn, the CPU 8 of the transferring apparatus 2 reaches step ST41 and, before performing the automatic transferring process RTa, references the preferential transfer setting information stored on the hard disk drive 12 to recognize that last reproduced music preferential transfer mode is currently established.

With last reproduced music preferential transfer mode found in effect, the CPU 8 of the transferring apparatus 2 goes to step ST42 and recognizes the album that contains the music data last reproduced by the apparatus 2 before its transfer button was pushed, in accordance with the attribute information associated with the last reproduced music data.

In step SP43, the CPU 8 of the transferring apparatus 2 selects the last reproduced music data as well as the other music data belonging to the album recognized from the attribute information associated with the stored music data.

In step SP44, the CPU 8 of the transferring apparatus 2 transfers automatically the last reproduced music data as well as the other music data also selected to the portable reproducing apparatus 5 by way of the connecting cable 3 and connecting cradle 4. After the data transfer, the CPU 8 reaches step SP45 and terminates the preferential automatic transferring procedure RTb2.

(3-3) Newly Recorded Music Preferential Transfer Mode

When music data has been newly acquired from the music providing server 7 or from CDs since the last music data transfer to the portable reproducing apparatus 5, the CPU 8 of the transferring apparatus 2 generates newly recorded music identification information for identifying the newly acquired music data and stores the generated information onto the hard disk drive 12.

The operating device 6 of the transferring apparatus 2 may then be operated to transfer preferentially the music data newly acquired by the apparatus 2 since the last music data transfer from the apparatus 2 to the portable reproducing apparatus 5. In response, the CPU 8 of the transferring apparatus 2 generates preferential transfer setting information indicating that newly recorded music preferential transfer mode is established, and stores the generated preferential transfer setting information onto the hard disk drive 12.

Thereafter, with the portable reproducing apparatus 5 placed in the connecting cradle 4, the transfer button 6A is pushed on the transferring apparatus 2. In turn, before executing the automatic transferring process RTa, the CPU 8 of the transferring apparatus 2 references the preferential transfer setting information stored on the hard disk drive 12 and thereby recognizes that newly recorded music preferential transfer mode is currently established. With newly recorded music preferential transfer mode found in effect, the CPU 8 of the transferring apparatus 2 selects the music data identified by the newly recorded music identification information held on the hard disk drive 12 from among a plurality of music data items stored on the HDD 12. The CPU 8 transfers automatically the selected music data to the portable reproducing apparatus 5 via the connecting cable 3 and connecting cradle 4.

As described, with the portable reproducing apparatus 5 placed in the connecting cradle 4, the transfer button 6A may be pushed on the transferring apparatus 2 set in newly recorded music preferential transfer mode. In that case, the transferring apparatus 2 transfers to the portable reproducing apparatus 5 the music data newly acquired by the transferring apparatus 2 since the last music data transfer to the portable reproducing apparatus 5, in preference to the music data to be transferred by the automatic transferring process RTa.

Figure 12:
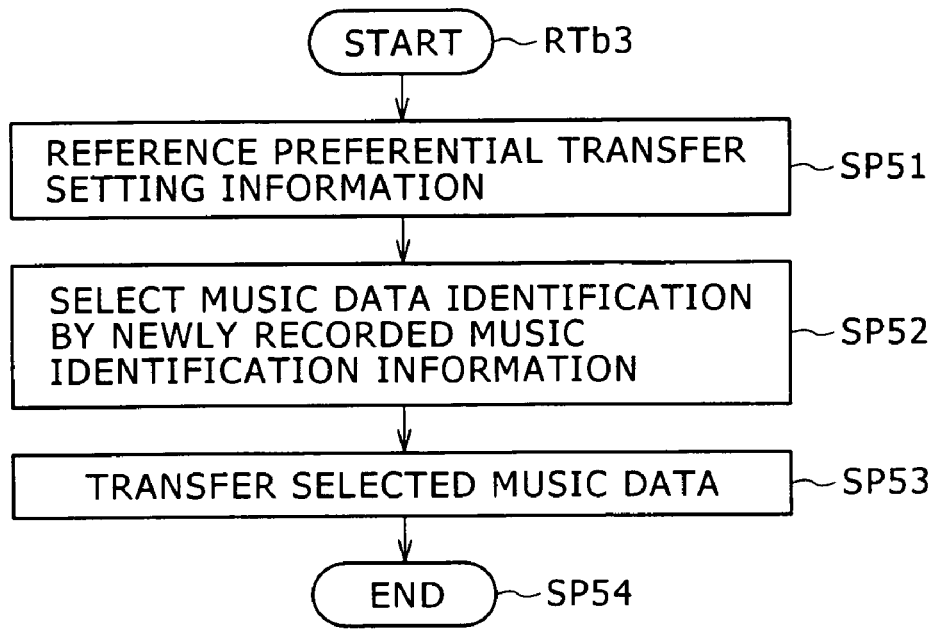
FIG. 12 is a flowchart of steps constituting a preferential automatic transferring procedure in newly recorded music preferential transfer mode.

How a preferential automatic transferring procedure RTb3 is performed in newly recorded music preferential transfer mode will now be described with reference to the flowchart of FIG. 12.

With the portable reproducing apparatus 5 placed in the connecting cradle 4, pushing the transfer button 6A of the transferring apparatus 2 causes the CPU 8 of the apparatus 2 to reach step SP51. In step SP51, before executing the automatic transferring process RTa, the CPU 8 references the preferential transfer setting information stored on the hard disk drive 12 and thereby recognizes that newly recorded music preferential transfer mode is currently established.

With newly recorded music preferential transfer mode found in effect, the CPU 8 of the transferring apparatus 2 goes to step SP52 and selects the music data identified by the newly recorded music identification information from among a plurality of music data items stored on the hard disk drive 12.

In step SP53, the CPU 8 of the transferring apparatus 2 transfers automatically the selected music data to the portable reproducing apparatus 5 via the connecting cable 3 and connecting cradle 4. After the music data transfer, the CPU 8 reaches step SP54 and terminates the preferential automatic transferring procedure RTb3.

(4) Automatic Deleting Process

Before transferring music data to the portable reproducing apparatus 5 by the automatic transferring process RTa or preferential automatic transferring process RTb, the CPU 8 of the transferring apparatus 2 may carry out an automatic deleting process for deleting some music data from the hard disk drive 19 of the portable reproducing apparatus 5.

There are two modes in which to perform the automatic deleting process: poorly evaluated music deletion mode, and reproduction count-based deletion mode. Poorly evaluated music deletion mode is a mode in which the music data poorly evaluated by the user listening to music with the portable reproducing apparatus 5 is deleted from the hard disk drive 19 of the apparatus 5. Reproduction count-based deletion mode is a mode in which the music data reproduced a predetermined number of times by the portable reproducing apparatus 5 is detected from the hard disk drive 19 of the apparatus 5.

The above-outlined two modes in which to perform the automatic deleting process will now be described individually in detail.

(4-1) Poorly Evaluated Music Deletion Mode

Illustratively, the user listening to music through the earphones of the portable reproducing apparatus 5 may operate the operating device 21 of the apparatus 5 to lower the evaluation of some music data stored on the hard disk drive 19 in the apparatus 5. In that case, the CPU 20 of the portable reproducing apparatus 5 generates music evaluation information indicating that the music data in question is poorly evaluated by the user, and stores the generated music evaluation information onto the hard disk drive 19.

Meanwhile, the operating device 6 of the transferring apparatus 2 may be operated to delete the music data poorly evaluated by the user from the hard disk drive 19 of the portable reproducing apparatus 5. In response, the CPU 8 of the transferring apparatus 2 generates deletion setting information indicating that poorly evaluated music deletion mode is established, and stores the generated deletion setting information onto the hard disk drive 12.

Later, with the portable reproducing apparatus 5 placed in the connecting cradle 4, the transfer button 6A may be pushed on the transferring apparatus 2. In turn, before performing the automatic transferring process RTa or preferential automatic transferring process RTb, the CPU 8 of the apparatus 2 references the deletion setting information stored on the hard disk drive 12 and thereby recognizes that poorly evaluated music deletion mode is currently established. With poorly evaluated music deletion mode found in effect, the CPU 8 of the transferring apparatus 2 reads the music evaluation information from the hard disk drive 19 of the portable reproducing apparatus 5 via the connecting cable 3 and connecting cradle 4. On the basis of the music evaluation information thus retrieved, the CPU 8 recognizes the music data poorly evaluated by the user. The CPU 8 of the transferring apparatus 2 proceeds to delete the poorly evaluated music data thus recognized from the hard disk drive 19 of the portable reproducing apparatus 5.

As described, with the portable reproducing apparatus 5 placed in the connecting cradle 4 and with the transferring apparatus 2 set in poorly evaluated music deletion mode, pushing the transfer button 6A causes the music data poorly evaluated by the user to be deleted automatically from the hard disk drive 19 of the portable reproducing apparatus 5 by way of the connecting cable 3 and connecting cradle 4. Deleting the disregarded music data raises the free storage capacity of the hard disk drive 19 in the portable reproducing apparatus 5. This makes it possible to transfer more music data to the portable reproducing apparatus 5 by the automatic transferring process RTa or preferential automatic transferring process RTb.

Figure 13:
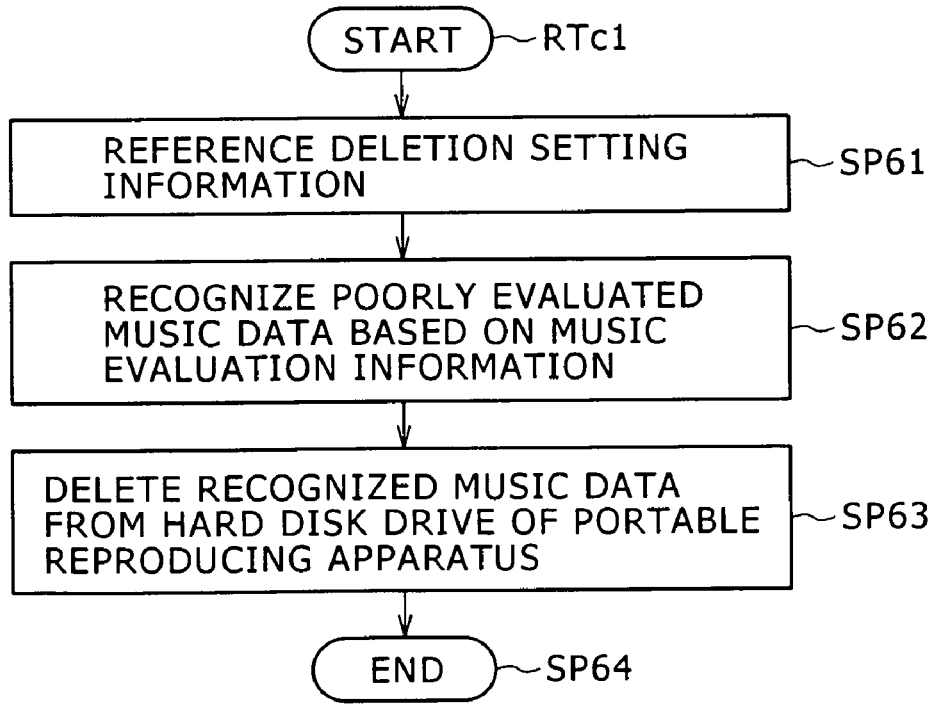
FIG. 13 is a flowchart of automatic deleting procedure in poorly evaluated music deletion mode.

How an automatic deleting procedure RTc1 is performed in poorly evaluated music deletion mode will now be described with reference to the flowchart of FIG. 13.

Illustratively, with the portable reproducing apparatus 5 placed in the connecting cradle 4, pushing the transfer button 6A of the transferring apparatus 2 causes the CPU 8 of the apparatus 2 to reach step SP61. In step SP61, before performing the automatic transferring process RTa or preferential automatic transferring process RTb, the CPU 8 of the transferring apparatus 2 references the deletion setting information stored on the hard disk drive 12 and thereby recognizes that poorly evaluated music deletion mode is currently established.

With poorly evaluated music deletion mode found in effect, the CPU 8 of the transferring apparatus 2 goes to step SP62. In step SP62, the CPU 8 reads the music evaluation information from the hard disk drive 19 of the portable reproducing apparatus 5 via the connecting cable 3 and connecting cradle 4. On the basis of the music evaluation information thus retrieved, the CPU 8 recognizes the music data poorly evaluated by the user from among the music data items stored on the hard disk drive 19 of the portable reproducing apparatus 5.

In step SP63, the CPU 8 of the transferring apparatus 2 deletes the poorly evaluated music data thus recognized from the hard disk drive 19 of the portable reproducing apparatus 5. After deleting the music data, the CPU 8 reaches step SP64 and terminates the automatic deleting procedure RTc1.

(4-2) Reproduction Count-Based Deletion Mode

The CPU 20 of the portable reproducing apparatus 5 is arranged to count the number of times each of the music data items stored on the hard disk drive 19 has been reproduced and to store onto the HDD 19 reproduction count information indicating the numbers of times thus counted.

Meanwhile, the operating device 6 of the transferring apparatus 2 may be operated to delete each music data item whose reproduction count has reached a predetermined count from the hard disk drive 19 of the portable reproducing apparatus 5. In response, the CPU 8 of the transferring apparatus 2 generates deletion setting information indicating that reproduction count-based deletion mode is established, and stores the generated deletion setting information onto the hard disk drive 12.

Later, with the portable reproducing apparatus 5 placed in the connecting cradle 4, the transfer button 6A may be pushed on the transferring apparatus 2. In turn, before performing the automatic transferring process RTa or preferential automatic transferring process RTb, the CPU 8 of the transferring apparatus 2 references the deletion setting information stored on the hard disk drive 12 and thereby recognizes that reproduction count-based deletion mode is currently established. With reproduction count-based deletion mode found in effect, the CPU 8 of the transferring apparatus 2 reads the reproduction count information from the hard disk drive 19 of the portable reproducing apparatus 5 via the connecting cable 3 and connecting cradle 4. On the basis of the reproduction count information thus retrieved, the CPU 8 recognizes the music data items of which the reproduction count has reached a predetermined count. The CPU 8 of the transferring apparatus 2 proceeds to delete the music data items thus recognized from the hard disk drive 19 of the portable reproducing apparatus 5.

As described, with the portable reproducing apparatus 5 placed in the connecting cradle 4 and with the transferring apparatus 2 set in reproduction count-based deletion mode, pushing the transfer button 6A deletes automatically the music data items of which the reproduction count has reached a predetermined count from the hard disk drive 19 of the portable reproducing apparatus 5 through the connecting cable 3 and connecting cradle 4. Deleting the infrequently reproduced music data raises the free storage capacity of the hard disk drive 19 in the portable reproducing apparatus 5. This makes it possible to transfer more music data to the portable reproducing apparatus 5 by the automatic transferring process RTa or preferential automatic transferring process RTb.

Figure 14:
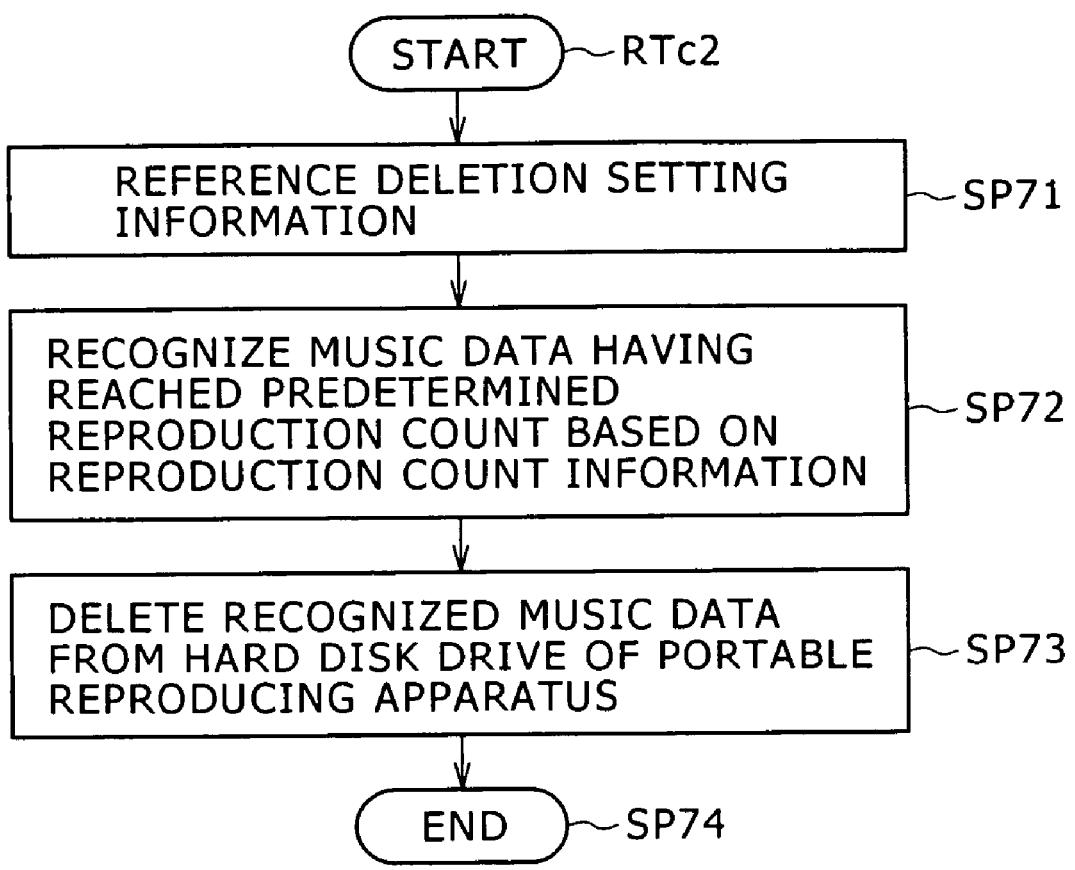
FIG. 14 is a flowchart of steps constituting an automatic deleting procedure in reproduction count-based deletion mode.

How an automatic deleting procedure RTc2 is performed in reproduction count-based deletion mode will now be described with reference to the flowchart of FIG. 14.

Illustratively, with the portable reproducing apparatus 5 placed in the connecting cradle 4, pushing the transfer button 6A of the transferring apparatus 2 causes the CPU 8 of the apparatus 2 to reach step SP71. In step SP71, before performing the automatic transferring process RTa or preferential automatic transferring process RTb, the CPU 8 of the transferring apparatus 2 references the deletion setting information stored on the hard disk drive 12 and thereby recognizes that reproduction count-based deletion mode is currently established.

With reproduction count-based deletion mode found in effect, the CPU 8 of the transferring apparatus 2 goes to step SP72. In step SP72, the CPU 8 reads the reproduction count information from the hard disk drive 19 of the portable reproducing apparatus 5 via the connecting cable 3 and connecting cradle 4. On the basis of the reproduction count information thus retrieved, the CPU 8 recognizes the music data of which the reproduction count has reached a predetermined count from among the music data items stored on the hard disk drive 19 of the portable reproducing apparatus 5.

In step SP73, the CPU 8 of the transferring apparatus 2 deletes the music data thus recognized from the hard disk drive 19 of the portable reproducing apparatus 5. After deleting the music data, the CPU 8 reaches step SP74 and terminates the automatic deleting procedure RTc2.

(5) Mandatory Transfer Setting Capability and Transfer-Denied Setting Capability With this embodiment, the user may perform what may be called a mandatory transfer setting operation on the operating device 6 of the transferring apparatus 2. The operation involves establishing the settings for always transferring certain music data from among the music data items stored on the hard disk drive 12 of the transferring apparatus 2 to the portable reproducing apparatus 5. In turn, the CPU 8 of the transferring apparatus 2 generates mandatory transfer setting information specifying that the music data in question be always transferred, and stores the generated mandatory transfer setting information onto the hard disk drive 12.

More specifically, the mandatory transfer setting operation above involves setting any one of diverse units in which to transfer music data, e.g., specifying that the music data subsumed under a certain folder FD (1, 2, etc.) be transferred, that the music data of a particular artist be transferred, or that the music data of a specific genre be transferred.

Later, with the portable reproducing apparatus 5 placed in the connecting cradle 4, the transfer button 6A may be pushed on the transferring apparatus 2. In turn, the CPU 8 of the transferring apparatus 2 references the mandatory transfer setting information stored on the hard disk drive 12 and thereby recognizes the music data that must be transferred to the portable reproducing apparatus 5. The CPU 8 of the transferring apparatus 2 then carries out the automatic transferring process RTa or the like in such a manner that the recognized music data is always included in the data to be transferred.

With this embodiment, the user may also perform what may be called a transfer-denied setting operation on the operating device 6 of the transferring apparatus 2. The operation involves establishing the settings for never transferring certain music data from among the music data items stored on the hard disk drive 12 of the transferring apparatus 2 to the portable reproducing apparatus 5. In turn, the CPU 8 of the transferring apparatus 2 generates transfer-denied setting information specifying that the music data in question never be transferred, and stores the generated transfer-denied setting information onto the hard disk drive 12.

More specifically, the transfer-denied setting operation above involves setting any one of diverse units in which not to transfer music data, e.g., specifying that the music data subsumed under a certain folder FD (1, 2, etc.) is not to be transferred, that the music data of a particular artist is not to be transferred, or that the music data of a specific genre is not to be transferred.

Later, with the portable reproducing apparatus 5 placed in the connecting cradle 4, the transfer button 6A may be pushed on the transferring apparatus 2. In turn, the CPU 8 of the transferring apparatus 2 references the transfer-denied setting information stored on the hard disk drive 12 and thereby recognizes the music data that must not be transferred to the portable reproducing apparatus 5. The CPU 8 of the transferring apparatus 2 then carries out the automatic transferring process RTa or the like in such a manner that the recognized music data is always excluded from the data to be transferred.

(6) Capability of the Portable Reproducing Apparatus to Establish Storage Areas

With this embodiment, it is possible to establish on the hard disk drive 19 of the portable reproducing apparatus 5 illustratively two storage areas: a designated music storage area, and an automatically transferred music storage area. The designated music storage area is an area that stores the music data designated by the user and transferred from the transferring apparatus 2. The automatically transferred music storage area is an area that accommodates the music data transferred automatically from the transferring apparatus 2 when the automatic transferring process RTa or preferential automatic transferring process RTb is carried out.

For example, suppose that the operating device 6 of the transferring apparatus 2 is operated to assign a space of 2 GB as the designated music storage area and a space of 8 GB as the automatically transferred music storage area in the portable reproducing apparatus 5. In that case, the CPU 8 of the transferring apparatus 2 allocates a 2-GB area as the designated music storage area and an 8-GB area as the automatically transferred music storage area on the hard disk drive 19 of the portable reproducing apparatus 5 via the connecting cable 3 and connecting cradle 4.

Thereafter, with the portable reproducing apparatus 5 placed in the connecting cradle 4, the transfer button 6A may be pushed on the transferring apparatus 2. In turn, the CPU 8 of the transferring apparatus 2 performs the automatic transferring process RTa or preferential automatic transferring process RTb to transfer music data to the automatically transferred music storage area on the hard disk drive 19 of the portable reproducing apparatus 5 connected via the connecting cable 3 and connecting cradle 4.

With the portable reproducing apparatus 5 placed in the connecting cradle 4, the user may designate transfer-destined music data on the operating device 6 of the transferring apparatus 2. In that case, the CPU 8 of the transferring apparatus 2 transfers the user-designated music data from among the music data items held on the hard disk drive 12 to the designated music storage area on the hard disk drive 19 of the portable reproducing apparatus 5 through the connecting cable 3 and connecting cradle 4.

In the manner described, in addition to the automatically selected music data to be transferred by the automatic transferring process RTa or preferential automatic transferring process RTb from the transferring apparatus 2, the user can select desired music data items and have them stored onto the hard disk drive 19 of the portable reproducing apparatus 5. This feature affords the user more convenience and ease of use in handling music data than ever before.

(7) Capability to Switch Transferring Processes

(7-1) Switchover Between Music Data Synchronizing Process and Automatic Transferring Process The transferring apparatus 2 of this embodiment has the capability to switch between two processes: the above-described automatic transferring process RTa, and a music data synchronizing process whereby all music data items stored on the hard disk drive 12 of the transferring apparatus are stored onto the hard disk drive 19 of the portable reproducing apparatus 5. This capability will now be described in more detail.

When the transferring apparatus 2 is connected to the portable reproducing apparatus 5 via the connecting cable 3 and connecting cradle 4, the CPU 8 of the apparatus 2 compares the total amount of the music data stored on the hard disk drive 12 of the transferring apparatus 2 with that of the music data held on the hard disk drive 19 of the portable reproducing apparatus 5. The comparison might let the CPU 8 recognize the storage capacity of the hard disk drive 19 in the portable reproducing apparatus 5 (e.g., 10 GB) to be greater than the total amount of the music data stored on the hard disk drive 12 of the transferring apparatus 2 (e.g., 5 GB). If that is the case, the CPU 8 of the transferring apparatus 2 carries out the music data synchronizing process whereby all music data items stored on the hard disk drive 12 of the transferring apparatus 2 are written to the hard disk drive 19 of the portable reproducing apparatus 5. It might also happen that as a result of the comparison, the CPU 8 recognizes the total amount of the music data stored on the hard disk drive 12 of the transferring apparatus 2 (e.g., 11 GB) to be greater than the storage capacity of the hard disk drive 19 in the portable reproducing apparatus 5 (e.g., 10 GB). In that case, the CPU 8 of the transferring apparatus 2 carries out the automatic transferring process RTa in such a manner that the music data items commensurate in quantity with the storage capacity of the hard disk drive 19 of the portable reproducing apparatus 5 will be selected and transferred to the HDD 19.

During the music data synchronizing process, the CPU 8 of the transferring apparatus 2 first recognizes illustratively those music data items which are held on the hard disk drive 12 of the transferring apparatus 2 but which are not found on the hard disk drive 19 of the portable reproducing apparatus 5. The CPU 8 then reads the recognized music data items from the hard disk drive 12 of the transferring apparatus 2 and transfers the retrieved music data items to the portable reproducing apparatus 5.

(7-2) Switchover Between Once-Through Transfer Mode and Shuffle Transfer Mode The transferring apparatus 2 of this embodiment also has the capability to switch between the automatic transferring process RTa1 performed in once-through transfer mode on the one hand, and the automatic transferring process RTa2 carried out in shuffle transfer mode on the other hand. This capability will now be described in more detail.

The operating device of the portable reproducing apparatus 5 of this embodiment includes a reproduction mode switchover button 21A that may be operated to switch between two modes: normal reproduction mode, and random reproduction mode. Normal reproduction mode is a mode in which a plurality of music data items stored on the hard disk drive 19 are reproduced in a predetermined sequence. Random reproduction mode is a mode in which the music data items held on the hard disk drive 19 are reproduced randomly. More specifically, with the reproduction mode switchover button 21A set to the normal reproduction mode position, a plurality of music data items stored on the hard disk drive 19 are reproduced in a predetermined sequence (e.g., in the order in which the data items were transferred from the transferring apparatus 2). If the reproduction mode switchover button 21A is set to the random reproduction mode position, the multiple music data items held on the hard disk drive 19 are reproduced randomly.

When the transferring apparatus 2 is connected to the portable reproducing apparatus 5 via the connecting cable 3 and connecting cradle 4, the CPU 8 of the apparatus 2 checks to determine whether the portable reproducing apparatus 5 is placed in normal reproduction mode or in random reproduction mode. If the CPU 8 recognizes the portable reproducing apparatus 5 to be in normal reproduction mode as a result of the above check, the CPU 8 carries out the automatic transferring process RTa1 to transfer the music data to the portable reproducing apparatus 5 in once-through mode. If the CPU 8 recognizes the portable reproducing apparatus 5 to be in random reproduction mode, the CPU 8 performs the automatic transferring process RTa2 to transfer the music data to the portable reproducing apparatus 5 in shuffle transfer mode.

(8) Transfer-Destined Music Designation Assisting Capability

The transferring apparatus 2 of this embodiment has what may be called a transfer music designation assisting capability that assists the user in designating the music data desired to be transferred to the portable reproducing apparatus 5. This capability will now be described in detail.

The CPU 8 of the transferring apparatus 2 selects randomly a predetermined number of music data items from a large number of music data items stored on the hard disk drive 12. Based on the attribute information about the selected music data items, the CPU 8 causes the display device 14 to display illustratively the titles and artist names of the selected music data items in list form on a transfer-destined music designation screen SC2 (FIG. 15).

The transfer-destined music designation screen SC2 of this embodiment typically shows check boxes corresponding to music data titles. The check boxes allow the user manipulating the operating device 6 of the transferring apparatus 2 to designate desired music data items, one title at a time, on the transfer-destined music designation screen SC2.

With one or a plurality of music data titles designated on the transfer-destined music designation screen SC2 by manipulating the operating device 6 of the transferring apparatus 2, the user pushes a "transfer" button BT1 on the transfer-destined music designation screen SC2 using the operating device 6. This causes the CPU 8 of the transferring apparatus 2 to read the designated music data titles from the hard disk drive 12 of the apparatus 2 and transfer the retrieved titles to the portable reproducing apparatus 5.

If a "next screen" button BT2 is pushed on the transfer-destined music designation screen SC2 by operation of the operating device 6 of the transferring apparatus 2, the CPU 8 of the apparatus 2 selects randomly a predetermined number of music data items from among the numerous music data items stored on the hard disk drive 12 except for those items whose titles have already been displayed on the transfer-destined music designation screen SC2. The CPU 8 then causes the display device 14 to display the titles and artist names of the newly selected music data items on the transfer-destined music designation screen SC2.

As described, the transferring apparatus 2 selects randomly a predetermined number of music data titles from among the numerous music data items stored on the hard disk drive 12 of the apparatus 2, and presents the user with the randomly selected music data titles to choose from. As opposed to the case of presenting the user with the many music data titles from the hard disk drive 12 of the transferring apparatus 2 in a predetermined sequence, this capability makes it possible to select evenly randomized groups of titles from the large number of music data titles for presentation to the user. As a result, the user finds it appreciably easier to find and designate the music data titles desired to be transferred from the hard disk drive 12 of the transferring apparatus 2 to the portable reproducing apparatus 5. The task of transferring content data to the portable reproducing apparatus 5 is thus made significantly easier than before.

(9) Other Variations

As part of the above-described embodiment of present the invention, the CPU 8 of the transferring apparatus 2 was shown to start the automatic transferring process RTa (1-3), preferential automatic transferring process RTb (1-3), or other processes RTc (1-2) when the transfer button 6A was pushed on the operating device 6. Alternatively, the CPU 8 may be arranged to start the automatic transferring process RTa (1-3), preferential automatic transferring process RTb (1-3), or other processes RTc (1-2) whenever detecting that the portable reproducing apparatus 5 is connected to the transferring apparatus 2.

The transferring apparatus 2 of the embodiment discussed above was shown classifying a plurality of acquired music data items into album groups AG1, AG2, etc. Alternatively, the transferring apparatus 2 may be arranged to classify the acquired music data items into groups of diverse kinds such as genres and artists. Once classified in such a manner, the music data items may be processed in the same manner as when classified into the album groups AG1, AG2, etc.

As part of the above-described embodiment of the invention, the transferring apparatus 2 was shown to select a predetermined number of titles in order of title display from among a plurality of music data items stored on the hard disk drive 12. Alternatively, music data titles may be selected in the order in which they were reproduced by the transferring apparatus 2, or in any other order desired.

In the foregoing description, the music data transferred from the transferring apparatus 2 was shown getting stored onto the hard disk drive 19 of the portable reproducing apparatus 5. Alternatively, the transferred music data may be written to some other appropriate storage medium (such as MD (Mini-Disk (registered trademark) or nonvolatile memory) that may be attached to the portable reproducing apparatus 5.

In the foregoing description, the content data transferred from the transferring apparatus 2 to the portable reproducing apparatus 5 was shown to be music data. Alternatively, the data to be transferred may be still picture data, moving picture data, programs, or text information.

In the above-described embodiment of the invention, the second apparatus connected to the first apparatus (i.e., transferring apparatus 2) through communicating means (i.e., connecting cable 3 and connecting cradle 4) was shown to be the portable reproducing apparatus 5. Alternatively, any one of diverse kinds of information processing equipment may be selected as the second apparatus connectable to the first apparatus as long as the selected apparatus is capable of receiving and storing the content data transferred from the first apparatus.

The CPU 8 of the transferring apparatus 2 in the above-described embodiment of the invention is arranged to perform its processes using software. Specifically, the CPU 8 reads suitable programs from a ROM (read only memory) 25 or from the hard disk drive 12 and loads the retrieved programs into a RAM (random access memory) 26 to execute the automatic transferring process RTa (1-3), preferential automatic transferring process RTb (1-3), or other processes RTc (1-2). Alternatively, the transferring apparatus 2 may be furnished with circuits for carrying out the automatic transferring process RTa (1-3), preferential automatic transferring process RTb (1-3), or other processes RTc (1-2) on a hardware basis. That is, the elements included in the appended claims may be implemented by hardware or by software.

The CPU 20 of the portable reproducing apparatus 5 as part of the above-described embodiment is arranged to perform its processes using software. Specifically, the CPU 20 reads relevant programs from a ROM 27 or from the hard disk drive 19 and loads the retrieved programs into a RAM 28 to carry out the steps and processes described earlier. Alternatively, the portable reproducing apparatus 5 may be provided with circuits for executing the steps and processes on a hardware basis.

Upon connection with the portable reproducing apparatus 5 via the connecting cable 3 and connecting cradle 4, the CPU 8 of the transferring apparatus 2 in the embodiment discussed above is arranged to check whether the portable reproducing apparatus 5 is set in normal reproduction mode or in random reproduction mode. When the portable reproducing apparatus 5 is found set in normal reproduction mode as a result of the check, the CPU 8 of the transferring apparatus 2 performs the automatic transferring process RTa1 in once-through mode to transfer music data to the portable reproducing apparatus. If the portable reproducing apparatus 5 is found set in random reproduction mode, then the CPU 8 carries out the automatic transferring process RTa2 in shuffle transfer mode to transfer music data to the portable reproducing apparatus 5. Alternatively, music data may be selected and transferred in a manner commensurate with any reproduction mode established set for the portable reproducing apparatus 5. In such a case, the CPU 8 of the transferring apparatus 2 may transfer the music data to the portable reproducing apparatus by any one of diverse methods that are deemed appropriate.

It should therefore be understood by those skilled in the art that various modifications, combinations, sub-combinations and alterations may occur depending on design requirements and other factor in so far as they are within the scope of the appended claims or the equivalents thereof.

What is claimed is:

1. A content transferring method for use with a first apparatus and a second apparatus interconnected by communicating means, said content transferring method comprising:

determining whether a capacity of a storage medium managed by said second apparatus is larger than a size of content data to be transferred from said first apparatus to said second apparatus;

performing a synchronizing process to synchronize content data stored in said first apparatus with content data stored in the storage medium managed by said second apparatus, when it is determined in the determining step that the capacity of said storage medium managed by said second apparatus is larger than the size of the content data to be transferred from said first apparatus to said second apparatus; and performing a selective transferring process when it is determined in the determining step that the capacity of said storage medium managed by said second apparatus is smaller than the size of the content data to be transferred from said first apparatus to said second apparatus, the selective transferring process including automatically selecting, by said first apparatus, without regard to content designation input by a user, a subset of the content data to be transferred, with a size of the selected subset of the content data being within a free storage capacity of said storage medium managed by said second apparatus and the selected subset of the content data being different from the content data stored on said storage medium managed by said second apparatus, based on a predetermined condition, and transferring by said first apparatus the selected subset of the content data to said second apparatus.

2. The content transferring method according to claim 1, wherein the step of performing the selective transferring process further comprises:

causing said first apparatus to select in a predetermined sequence a plurality of content data items from among a plurality of content data items stored on a storage medium managed by said first apparatus, the selected content data items being other than those already transferred to said second apparatus; and causing said first apparatus to transfer said selected content data items to said second apparatus.

3. The content transferring method according to claim 1, wherein the step of performing the selective transferring process further comprises:

causing said first apparatus to select randomly a plurality of content data items from among a plurality of content data items stored on a storage medium managed by said first apparatus, the selected content data items being other than those already transferred to said second apparatus; and causing said first apparatus to transfer said selected content data items to said second apparatus.

4. The content transferring method according to claim 1, wherein the step of performing the selective transferring process further comprises:

causing said first apparatus to classify into groups a plurality of content data items stored on a storage medium managed by said first apparatus, the classification being made according to attribute information attached to said content data items; and causing said first apparatus to select a predetermined number of content data items from each of the groups accommodating the classified content data items and to transfer the selected content data items to said second apparatus.

5. The content transferring method according to claim 1, wherein the step of performing the selective transferring process further comprises:

causing said first apparatus preferentially to select the content data frequently reproduced by said first apparatus from among a plurality of content data items stored on a storage medium managed by said first apparatus; and causing said first apparatus to transfer the selected content data to said second apparatus.

6. The content transferring method according to claim 1, wherein the step of performing the selective transferring process further comprises:

causing said first apparatus to select the content data item last reproduced by said first apparatus from among a plurality of content data items stored on a storage medium managed by said first apparatus; and causing said first apparatus to transfer the selected content data item to said second apparatus.

7. The content transferring method according to claim 6, further comprising:

causing said first apparatus to classify into groups a plurality of content data items stored on a storage medium managed by said first apparatus, the classification being made according to attribute information attached to said content data items;

causing said first apparatus additionally to select other content data items belonging to a same group to which said selected content data item belongs; and causing said first apparatus to transfer the selected content data items to said second apparatus.

8. The content transferring method according to claim 1, wherein the step of performing the selective transferring process further comprises:

causing said first apparatus preferentially to select, from among a plurality of content data items stored on a storage medium managed by said first apparatus, any content data items newly acquired from outside since the last transfer of content data to said second apparatus; and causing said first apparatus to transfer the selected content data items to said second apparatus.

9. The content transferring method according to claim 1, wherein the step of performing the selective transferring process further comprises:

causing said first apparatus to recognize the content data poorly evaluated by a user from among said content data stored on said storage medium managed by said second apparatus; and causing said first apparatus to delete the recognized content data from said storage medium managed by said second apparatus.

10. The content transferring method according to claim 1, wherein the step of performing the selective transferring process further comprises:

causing said first apparatus to recognize, according to reproduction count information acquired from said second apparatus, the content data having reached a predetermined reproduction count from among said content data stored on said storage medium managed by said second apparatus; and causing said first apparatus to delete the recognized content data from said storage medium managed by said second apparatus.

11. The content transferring method according to claim 1, wherein the step of performing the selective transferring process further comprises causing said first apparatus to transfer to said second apparatus the content data designated by a user carrying out a mandatory transfer setting operation and not to transfer to said second apparatus the content data designated by said user performing a transfer-denied setting operation.

12. The content transferring method according to claim 1, wherein the step of performing the selective transferring process further comprises:

causing said first apparatus to recognize a free storage capacity of said storage medium managed by said second apparatus and to select content data of which the entire capacity is accommodated by the recognized free storage capacity; and causing said first apparatus to transfer the selected content data to said second apparatus.

13. The content transferring method according to claim 1, wherein the step of performing the selective transferring process with said second apparatus set in a specific reproduction mode further comprises:

causing said first apparatus to select, according to a condition corresponding to said specific reproduction mode, a plurality of content data items from among a plurality of content data items stored on a storage medium managed by said first apparatus; and causing said first apparatus to transfer the selected content data items to said second apparatus.

14. The content transferring method according to claim 13, wherein the step of performing the selective transferring process with said second apparatus further comprises:
   causing said first apparatus to select randomly a plurality of content data items from among a plurality of content data items stored on a storage medium managed by said first apparatus; and
   causing said first apparatus to transfer the selected content data items to said second apparatus.

15. The content transferring method according to claim 1, wherein the step of performing the selective transferring process further comprises:
   causing said first apparatus to present a user with a plurality of content data items selected randomly from among a plurality of content data items stored on a storage medium managed by said first apparatus; and
   causing said first apparatus to transfer to said second apparatus the content data items selected by said user from among the presented content data items.

16. A transferring apparatus, comprising:
   storing means for storing content data;
   comparing means for comparing a capacity of a storage medium managed by a connectable apparatus connected to said transferring apparatus through communicating means, with a size of content data to be transferred from said storing means to said connectable apparatus;
   synchronizing means for, when the capacity of said storage medium managed by said connectable apparatus is found by said comparing means to be larger than the size of the content data to be transferred to said connectable apparatus, synchronizing the content data stored in said storing means with content data stored in said storage medium managed by said connectable apparatus; and
   selective transferring means for, when the capacity of said storage medium managed by said connectable apparatus is found by said comparing means to be smaller than the size of the content data to be transferred to said connectable apparatus, automatically selecting, without regard to a content designation input by a user, a subset of the content data, with a size of the selected subset of the content data being within a free storage capacity of said storage medium managed by said connectable apparatus and the selected subset of the content data being different from the content data stored on said storage medium managed by said connectable apparatus, based on a predetermined condition, before transferring the selected subset of the content data to said connectable apparatus.

17. A computer-readable medium storing computer executable instructions, wherein the instructions, when executed by a processor, cause the processor to perform a method comprising:
   comparing a capacity of a storage medium managed by a connectable apparatus connected to a transferring apparatus through communicating means, with a size of content data to be transferred from said transferring apparatus to said connectable apparatus;
   synchronizing content data stored on a storage medium of said transferring apparatus with content data stored in said storage medium managed by said connectable apparatus, when the capacity of said storage medium managed by said connectable apparatus is found in said comparing to be larger than the size of the content data to be transferred to said connectable apparatus; and
   automatically selecting, by the transferring apparatus, when the capacity of said storage medium managed by said connectable apparatus is found in said comparing step to be smaller than the size of the content data to be transferred to said connectable apparatus, without regard to content designation input by a user, a subset of the content data, with a size of the selected subset of the content data being within a free storage capacity of said storage medium managed by said connectable apparatus and the selected subset of the content data being different from the content data stored on said storage medium managed by said connectable apparatus based on a predetermined condition, and transferring the selected subset of the content data to said connectable apparatus.

18. A transferring apparatus, comprising:
   a storing device configured to store content data;
   a comparing device configured to compare a capacity of a storage medium managed by a connectable apparatus connected to said transferring apparatus through a communicating device, with a size of content data to be transferred from said storing device to said connectable apparatus;
   a synchronizing device configured to synchronize the content data stored in said storing device with content data stored in said storage medium managed by said connectable apparatus, when the capacity of said storage medium managed by said connectable apparatus is found by said comparing device to be larger than the size of the content data to be transferred to said connectable apparatus; and
   a selective transferring device configured to automatically select, when the capacity of said storage medium managed by said connectable apparatus is found by said comparing device to be smaller than the size of the content data to be transferred to said connectable apparatus, without regard to content designation input by a user, a subset of the content data, with a size of the selected subset of the content data being within a free storage capacity of said storage medium managed by said connectable apparatus and the selected content data being different from the content data stored on said storage medium managed by said connectable apparatus based on a predetermined condition, before transferring the selected subset of the content data to said connectable apparatus.

19. The content transferring method according to claim 1, further comprising:
   causing said first apparatus to display a transfer setting information that allows a user to select a desired transfer mode from a plurality of predetermined transfer modes, and
   causing the first apparatus to select the content data to be transferred based on the selected transfer mode, which is the predetermined condition.

* * * * *